(12) United States Patent
Yu et al.

(10) Patent No.: US 8,804,881 B2
(45) Date of Patent: Aug. 12, 2014

(54) DATA COMMUNICATION DEVICES, METHODS, AND SYSTEMS

(75) Inventors: Zhi-Zhong Yu, Reading (GB); Divaydeep Sikri, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 13/181,268

(22) Filed: Jul. 12, 2011

(65) Prior Publication Data

US 2012/0014482 A1 Jan. 19, 2012

Related U.S. Application Data

(60) Provisional application No. 61/363,647, filed on Jul. 13, 2010.

(51) Int. Cl.
*H03D 1/00* (2006.01)

(52) U.S. Cl.
USPC ............ 375/343; 375/341; 375/150; 375/262

(58) Field of Classification Search
USPC ......................................................... 375/343
See application file for complete search history.

(56) References Cited

U.S. PATENT DOCUMENTS

| 5,060,266 | A | * | 10/1991 | Dent | 380/274 |
| 5,140,627 | A | * | 8/1992 | Dahlin | 455/436 |
| 5,390,216 | A | * | 2/1995 | Bilitza et al. | 375/354 |
| 6,683,907 | B2 | * | 1/2004 | Ling | 375/147 |
| 7,424,071 | B2 | * | 9/2008 | Allpress et al. | 375/343 |
| 8,175,200 | B2 | * | 5/2012 | Chen | 375/346 |
| 2001/0024426 | A1 | | 9/2001 | Zeira et al. | |
| 2004/0192215 | A1 | | 9/2004 | Onggosanusi et al. | |
| 2005/0002477 | A1 | * | 1/2005 | Kajita et al. | 375/341 |
| 2005/0069060 | A1 | | 3/2005 | Saito | |
| 2009/0003427 | A1 | | 1/2009 | Yan et al. | |

FOREIGN PATENT DOCUMENTS

WO WO2009108586 A2 9/2009

OTHER PUBLICATIONS

International Search Report and Written Opinion—PCT/US2011/043894—ISA/EPO—Nov. 30, 2011.
Motorola: "MUROS Intra-Cell Interference and TSC Design", 3GPP Draft; MUROS TSS Design (REV2), 3rd Generation Partnership Project (3GPP), Mobile Competence Centre, vol. TSG Geran, May 6, 2008, p. 14, XP050020221, France [retrieved on May 6, 2008] p. 1, paragraph 4.

* cited by examiner

*Primary Examiner* — Lihong Yu

(57) ABSTRACT

Data communication devices, methods, and systems are discussed in this application. In one embodiment, a receiving apparatus generally comprises a detector, an indicator, and a decision device. The detector can detect a number of data streams contained in a signal received on a single physical channel. Detection can be made by comparing a received signal with one or more predetermined sequences and identifying one or more of the plural predetermined sequences as being likely contained within the received signal. Each data stream can be associated with at least one predetermined sequences. The indicator can provide an indication of the data streams likely contained in the signal based on the identified sequences. A decision device can provide data defining a receiver configuration based on the indication, the receiver configuration being suitable for configuring a decoder to decode only the one or more data streams indicated as being likely contained in the signal. Other aspects, embodiments, and features are also claimed and discussed.

29 Claims, 15 Drawing Sheets

DATA COMMUNICATION DEVICES, METHODS, AND SYSTEMS

PRIORITY CLAIM & REFERENCE TO RELATED APPLICATION

This patent application claims priority to and the benefit of U.S. Provisional Application No. 61/363,647, filed 13 Jul. 2010, entitled "A Method And Apparatus For Detecting Data Streams In Communication System," which is incorporated herein by reference as if fully set forth below in its entirety.

TECHNICAL FIELD

Embodiments of the invention relate generally to communication systems, and, more particularly, to apparatuses, devices, methods, and systems for transmitting, detecting, and receiving data streams in a communication system. Embodiments of the present invention may be incorporated in receivers and/or transmitters as desired.

BACKGROUND

Frequency spectrum is valuable to operators of communication systems and therefore efforts continue to be made to increase usage of existing spectrum. At present each physical channel of a TDMA cellular communication system is allocated for use in any one cell by a single user or mobile station. It has been proposed to use a single physical channel for transmitting or receiving data intended for multiple mobile stations in a TDMA cellular communications system, thereby increasing usage of existing spectrum.

International patent application number PCT/US2009/031393, filed on 19 Jan. 2009, assigned to the assignee of this patent application, and incorporated herein by reference, describes using a single channel frequency and a single time slot (i.e. a single physical channel) for transmitting data two or more receiving apparatus. This application also describes using signalling training sequence set information to a remote station. For example, receiving signalling from a remote station indicating if a new set of training sequences is supported, and using a channel description to signal the training sequence set to be used by the remote station for a communication channel being established.

Using training-sequence-set-signal information uses communication bandwidth or capacity. It is therefore desirable to reduce bandwidth associated with signalling. It is particularly desirable to reduce signalling during a connection because bandwidth is more restricted during a connection than in a non-connected state. This applies especially to a circuit-switched or voice connection where minimal latency is allowable.

A mobile station with an advanced receiver can receive a signal containing two data streams intended for two mobile stations transmitted on a single physical channel and can decode both data streams. The mobile station can use interference cancellation to use one data stream as its own data and treat the other data stream as interference. Such an advanced receiver performs more processing and therefore consumes more battery current, when decoding more than one data stream, than a conventional receiver would consume when decoding a single data stream.

When at least one of the data streams is transmitted at half-rate using discontinuous transmission (DTX) and another data stream is transmitted at full rate, the signal will contain two data streams during some time intervals, and will contain only one data stream during other time intervals. A disadvantage is that the mobile station with the advanced receiver may perform more processing and consume more battery current than is needed during periods when the signal contains only one data stream. One possible solution would be to signal to the receiver the amount of required processing repeatedly during a connection, for example at every DTX event. However, a large amount of signalling would be required to do this, using valuable communication bandwidth.

BRIEF SUMMARY OF EXEMPLARY EMBODIMENTS

Embodiments of the present invention address the above-discussed issues and provide additional features. For example, some embodiments of the present invention include mobile stations and receivers that can receive multiple data streams without any need for signalling. While some embodiments of the present invention may be discussed below in the context of receivers, the invention is not so limited. Indeed, embodiments can include many wireless communication devices capable of transmitting and receiving communication signals, such as wireless remote stations (e.g., base stations and mobile stations). Embodiments of the present invention can also include other articles of manufacture such as processors, chip sets, controllers, and other computational devices. Other embodiments of the present invention can include storage mediums containing code or instruction set capable of being executed. Still yet, embodiments of the present invention can include receivers, transmitters, and transceivers.

For example, some embodiments of the invention can include a receiver for detecting data streams in a communication system. A receiving apparatus can generally comprise a detecting apparatus. The detecting apparatus can generally comprise a detector configured to detect a number of data streams contained within a signal received on a single physical channel. Detection can include comparing a received signal with one or more predetermined sequences and identifying one or more of the plural predetermined sequences as being likely contained within the received signal. Each data stream can be associated with one of the plural predetermined sequences. The receiving apparatus can also include an indicator. The indicator can be coupled to the detector and configured to provide an indication of the data streams likely contained in the signal. The receiving apparatus can also include a decision device. The decision device can be coupled to the detecting apparatus and configured to provide data defining a receiver configuration based on the indication, the receiver configuration being suitable for configuring a decoder to decode only the one or more data streams indicated as being likely contained in the signal.

Embodiments of the present invention can have additional features. For example, embodiments can enable the transmission and receipt of plural data streams on a single physical channel without any signalling of information about the transmitted or received data streams. Embodiments of the invention enable detection of data streams contained within a signal using data sequences contained within the signal.

Detecting data streams contained within a signal enables a quick determination of the number of data streams likely contained in the signal. Knowledge obtained prior to full decoding of how many, or which, data streams are likely contained in the received signal enables the decoding parameters of a receiving apparatus to be optimised, prior to full decoding, according to which, or how many, data streams are likely contained in the received signal, thus reducing processing requirements of the decoding.

Additional embodiments of the present invention can include components in a wireless communication system comprising wireless communication devices configured to communicate with at least one other wireless communication device. Such components can include mobile or stationary wireless communication devices that generally comprise a receiver, a detector, and an adjustable decoder. The receiver can be configured to receive one or more wireless data signals. The one or more data signals can contain a plurality of data streams with at least two data streams being from different sources. The detector can be configured to iteratively detect a number of data streams present in the one or more wireless data signals by comparing. The adjustable decoder can be configured to receive data stream information and adjust decoding of received wireless data signals based on the determined number of data streams. Communication devices can also comprise a memory for storing a plurality of predetermined sequence numbers. Receivers can be configured to compare at least a portion of the one or more data signals to the predetermined sequence numbers to determine the number of data streams. In addition, the detector can be configured to iteratively detect the number of present data streams by detecting a first, initial data stream and subsequently attempting to decode one or more subsequent data streams.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Features of the invention together with advantages thereof will become clearer from consideration of the following detailed description of apparatus and methods which are given by way of example with reference to the accompanying drawings.

DETAILED DESCRIPTION OF EXEMPLARY & PREFERRED EMBODIMENTS

Figure 1:
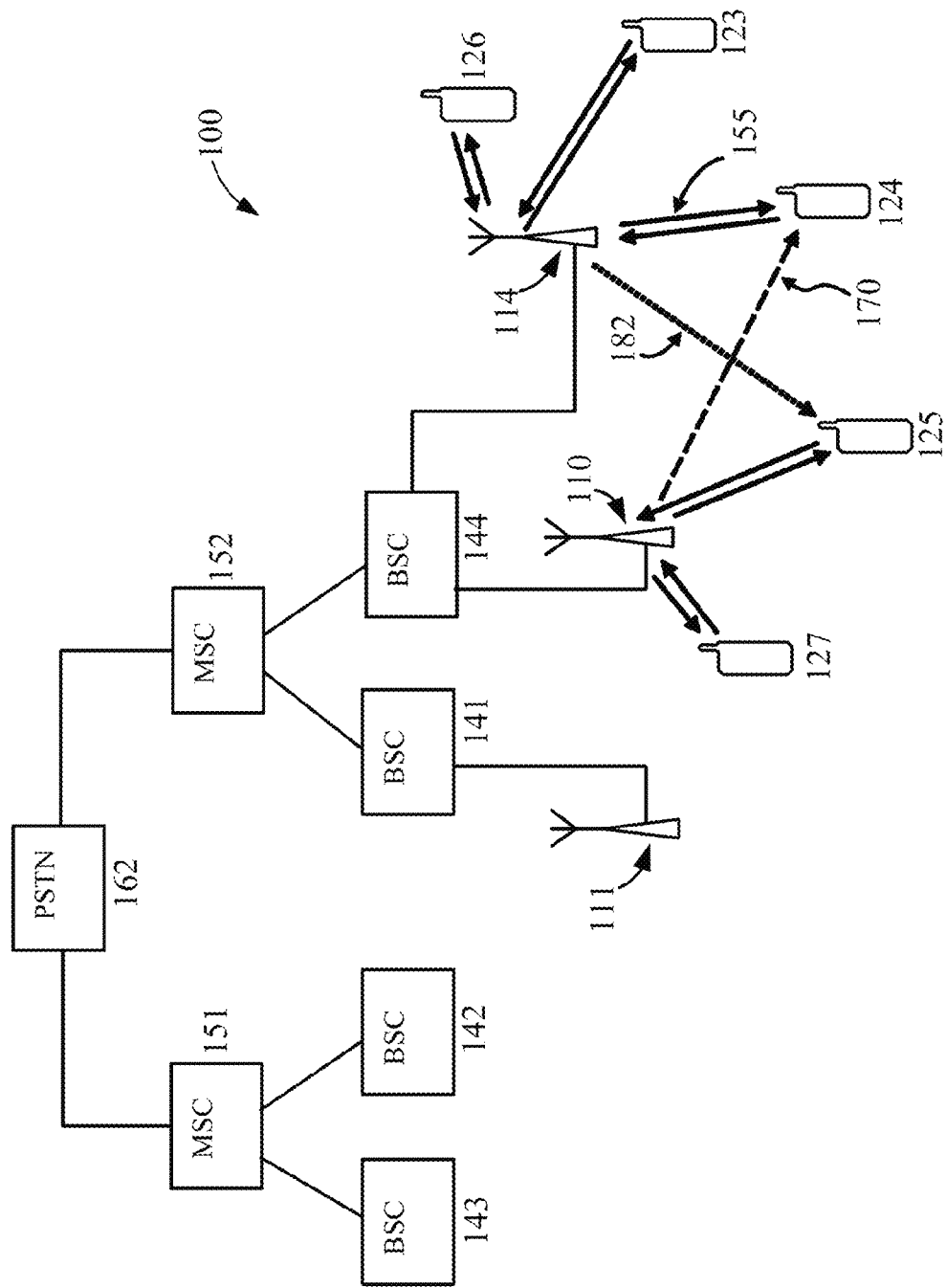
FIG. 1 is a schematic diagram illustrating elements of a wireless communication system according to some embodiments of the present invention.

FIG. 1 is a schematic diagram illustrating elements of a wireless communication system 100. In a cellular wireless communications system, transmitted data is multiplexed so as to allow a plurality of remote stations 123-127 to communicate with a single base station 110, 111, 114. Examples of multiplexing techniques are frequency division multiple access (FDMA), and time division multiple access (TDMA).

Frequency division multiple access (FDM or FDMA) is a multiple access technique wherein each active connection is allocated a particular communication channel (physical channel) having a particular channel frequency for a downlink signal and a particular channel frequency for an uplink signal. The downlink signal is transmitted by a base station 110, 111, 114 of the network and received by a remote station 123-127. The uplink signal is transmitted by a remote station 123-127 and received by a base station 110, 111, 114.

Time division multiple access (TDMA) is a multiple access technique which allows different users or communication terminals to use a communication link during different intervals of time, commonly referred to as time slots. Such time slots repeat in a regular pattern. For example, there may be eight consecutive time slots which repeat regularly.

According to a scheme known as frequency division duplex (FDD), the frequencies for downlink and uplink signals are different to each other, to minimise interference between transmitted signals and received signals at either a remote station 123-127 or a base station 110, 111, 114 and to allow simultaneous transmission and reception by one device e.g. the remote station.

Time-division duplex (TDD) is an access technique which allows transmit and receive operations in a communication apparatus (e.g. a base station or a remote station) to occur at different instances of time. This can reduce interference to received signals by transmitted signals.

The wireless communication system 100 herein described has all the above-mentioned features of TDMA, FDMA, FDD and TDD and is a cellular communication system. It should however be appreciated that various multiple access schemes, coding techniques and system configurations may be used, other than, or in addition to those described herein.

The wireless communication system 100 includes a network comprising base stations 110, 111 and 114, base station controllers 141 to 144, and mobile switching centres 151, 152. The wireless communication system 100 also includes remote stations 123-127.

The base station controllers 141-144 act to route signals to and from the different remote stations 123-127, under the control of the mobile switching centres 151, 152. The mobile switching centres 151, 152 are connected to a public switched telephone network (PSTN) 162. Although remote stations 123-127 are commonly handheld mobile devices, many fixed wireless devices and wireless devices capable of handling data also fall under the general title of remote station 123-127. A remote station 123-127 comprises a receiving apparatus for decoding plural independent data streams.

Signals carrying data are transferred between each of the remote stations 123-127 and other remote stations 123-127 by means of the base station controllers 141-144 under the control of the mobile switching centres 151, 152. Alternatively, signals carrying data are transferred between each of the remote stations 123-127 and other communications equipment of other communications networks via the public switched telephone network 162. The public switched telephone network 162 allows calls to be routed between the mobile cellular system 100 and other communication systems. Such other systems include other mobile cellular communications systems 100 of different types and conforming to different standards.

Each of the remote stations 123-127 can be serviced by any one of a number of base stations 110, 111, 114. A remote station 124 receives both a signal transmitted by the serving base station 114 and signals transmitted by nearby non-serving base stations 110, 111 and intended to serve other remote stations 125.

During a connection, signals are transmitted on a physical channel and received on a physical channel. Usually each channel for transmission is associated with a corresponding channel for reception. In the wireless communication system 100 each physical channel comprises a particular channel frequency and a particular time slot. A remote station includes a time slot identifier which identifies the particular time slot, and a channel identifier that identifies the physical channel as the particular channel frequency and the particular time slot. The operations of the time slot identifier and the channel identifier are well known and need not be described here.

The term "handover" refers to a method of transferring a data session or an ongoing call from one physical channel to another physical channel. The strengths of the different signals from base stations 110, 111, 114 are periodically measured by a remote station 124 and reported to BSC 144, 114, etc. Base stations in adjacent cells transmit signals using different sets of channels.

If the signal from a nearby base station 110, 111 becomes stronger than that of the serving base station 114, then the mobile switching centre (MSC) 152 will usually act to make the nearby base station 110, 111 become the serving base station and to make the serving base station 114 become a non-serving base station. The MSC 152 thus performs a handover of the remote station to the nearby base station 110.

Handover may also occur when signals transmitted on the same channel by two base stations in non-adjacent cells are received at similar amplitudes by a remote station. One of the signals is intended for the remote station (the wanted signal) and the other signal acts as interference to the wanted signal. If the remote station cannot receive and decode the wanted signal in the presence of the interfering signal, the network will perform a handover to allocate another channel to the remote station.

The process of handover reduces the actual capacity of the network because handover involves signalling between the network and the remote station and the signalling uses communication bandwidth. It is therefore desirable to minimise the number of handovers.

Figure 2:
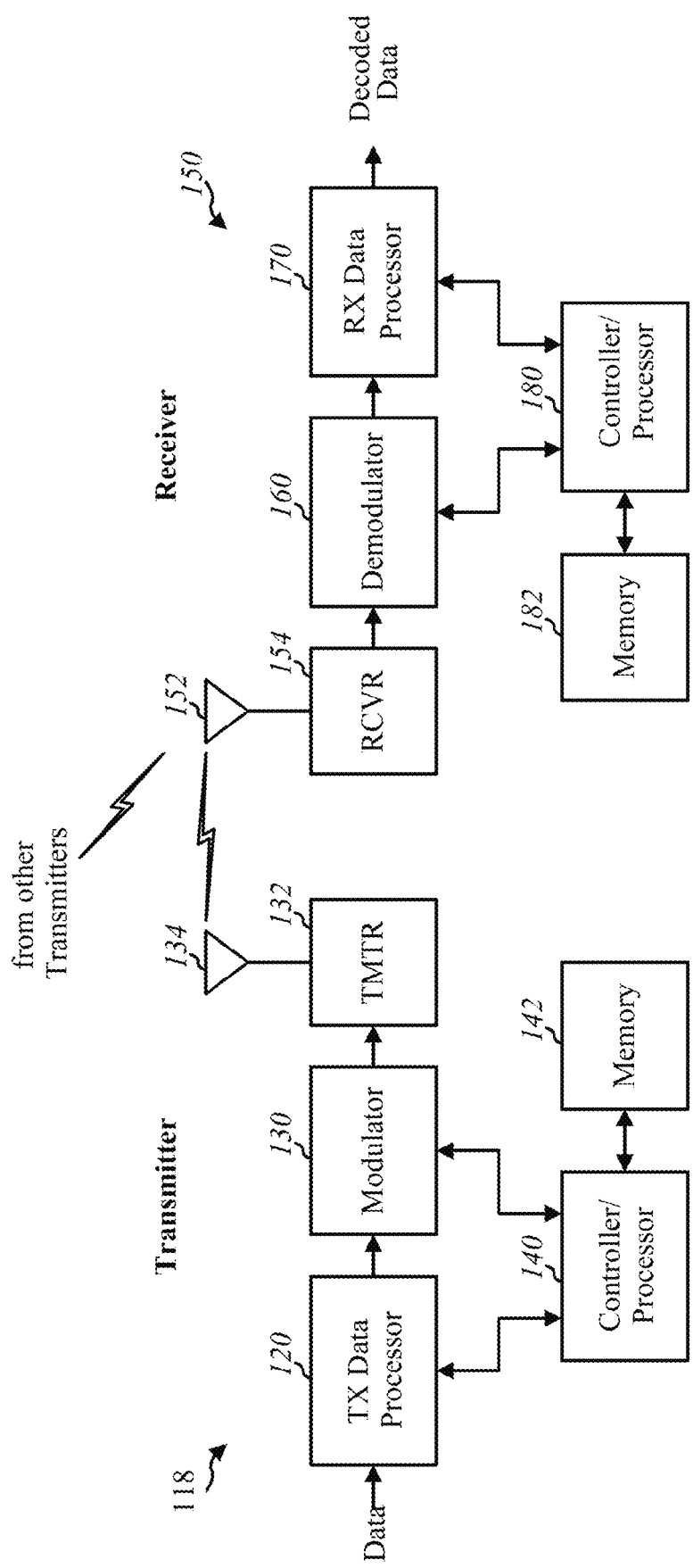
FIG. 2 is a schematic diagram of a transmitter and a receiver of the wireless communication system of FIG. 1 according to some embodiments of the present invention.

FIG. 2 is a schematic diagram of a transmitter 118 and a receiver 150 of the wireless communication system 100 of FIG. 1. For the downlink, the transmitter 118 may be part of a base station, and the receiver 150 may be part of a wireless device (remote station). For the uplink, the transmitter 118 may be part of a wireless device such as a remote station, and the receiver 150 may be part of a base station.

At the transmitter 118, a transmit data processor 120 receives and processes (e.g., formats, encodes, and interleaves) data and provides coded data. A modulator 130 performs modulation on the coded data and provides a modulated signal. A transmitter unit 132 conditions (e.g., filters, amplifies, and upconverts) the modulated signal and generates an RF modulated signal, which is transmitted via an antenna 134.

At the receiver 150, an antenna 152 receives the transmitted RF modulated signal from transmitter 118 together with transmitted RF modulated signals from other transmitters. The antenna 152 provides a received RF signal to a receiver unit 154. The receiver unit 154 conditions (e.g., filters, amplifies, and downconverts) the received RF signal, digitizes the conditioned signal, and provides samples. A demodulator 160 processes the samples and provides demodulated data. A receive data processor 170 processes (e.g., deinterleaves and decodes) the demodulated data and provides decoded data. In general, the processing by demodulator 160 and receive data processor 170 is complementary to the processing by modulator 130 and transmit data processor 120, respectively, at transmitter 110.

Controllers/processors 140 and 180 control operations at transmitter 118 and receiver 150, respectively. Memories 142 and 182 store program codes in the form of computer software, and data used by transmitter 118 and receiver 150 respectively.

Figure 3:
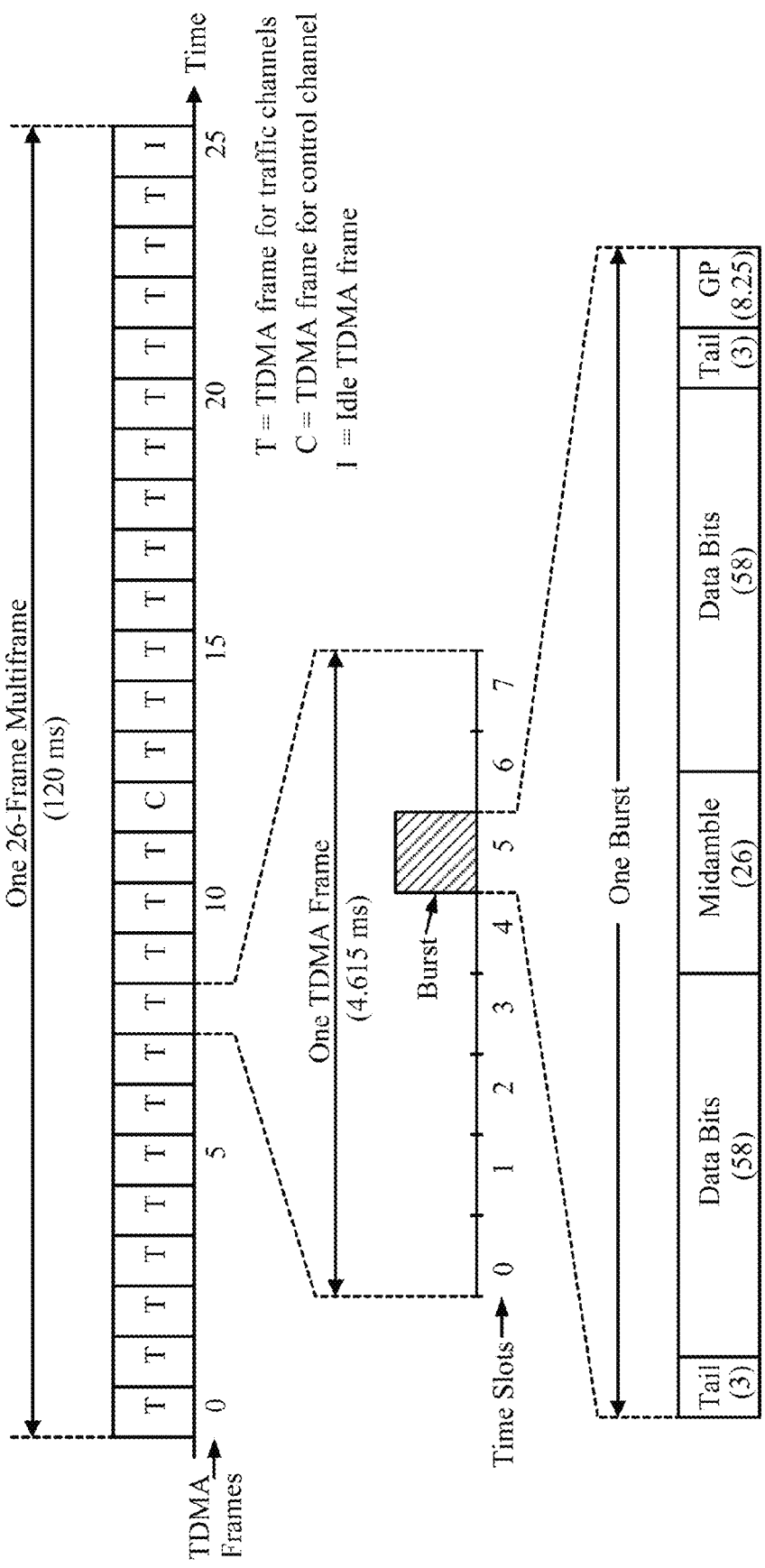
FIG. 3 is a diagram illustrating frame formats and burst formats in a TDMA communication system according to some embodiments of the present invention.

FIG. 3 is a diagram illustrating frame formats and burst formats used in a TDMA system. The frame formats and burst formats comply with the Global System for Mobile (GSM) standards. Each time slot within a frame is used for transmitting a "burst" of data. Sometimes the terms time slot and burst may be used interchangeably. Each burst includes two tail fields, two data fields, a training sequence (or midamble) field, and a guard period (labeled GP in the figure). The number of symbols in each field is shown inside the parentheses in the figure. A burst includes 148 symbols for the tail, data, and midamble fields. No symbols are sent in the guard period. TDMA frames are numbered and formed in groups of 26 or 51 TDMA frames called multiframes.

For traffic channels that are used to send user-specific data, each multiframe in this example includes 26 TDMA frames, which are labeled as TDMA frames 0 through 25. The traffic channels are sent in TDMA frames 0 to 11 and in TDMA frames 13 to 24 of each multiframe. A control channel is sent in TDMA frame 12. No data is sent in idle TDMA frame 25, which is used by the wireless devices to make measurements for neighbor base stations 110, 111, 114.

Figure 4:
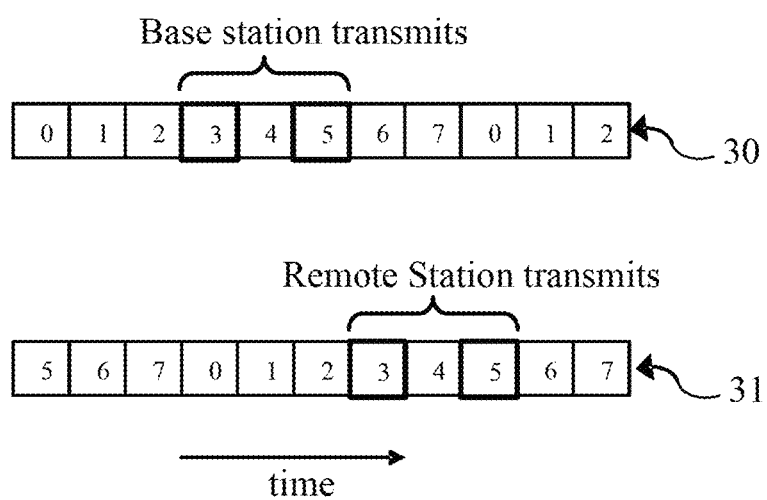
FIG. 4 is a diagram illustrating an example arrangement of time slots for a TDMA communication system according to some embodiments of the present invention.

FIG. 4 is a diagram illustrating an example arrangement of time slots for a TDMA communications system. A base station 114 transmits plural data signals on an allocated frequency and in a sequence of numbered time slots 30, each signal being for only one of a set of remote stations 123-127 and each signal being received at the antenna of all remote stations 123-127 within range of the transmitted signals.

Each channel frequency and time slot combination forms a physical channel for communication. For example, a first remote station 124 and a second remote station 126 are both allocated the same channel frequency. The first remote station 124 is allocated a first time slot 3 and a second remote station 126 is allocated a second time slot 5. The base station 114 transmits, in this example, a signal for the first remote station 124 during time slot 3 of the sequence of time slots 30, and transmits a signal for the second remote station 126 during time slot 5 of the sequence of time slots 30.

The first and second remote stations 124, 126 are active during their respective time slots 3 and 5 of time slot sequence 30, to receive the signals from the base station 114. The remote stations 124, 126 transmit signals to the base station 114 during corresponding time slots 3 and 5 of time slot sequence 31 on the uplink. It can be seen that the time slots for the base station 114 to transmit (and the remote stations 124, 126 to receive) 30 are offset in time with respect to the time slots for the remote stations 124, 126 to transmit (and the base station 114 to receive) 31.

This time division duplexing (TDD) allows transmit and receive operations to occur at different instances of time in a base station or a in a remote station, thus reducing interference to received signals by transmitted signals.

Voice signals and data signals are not the only signals to be transmitted between the base station 110, 111, 114 and the remote station 123-127. A control channel is used to transmit data that controls various aspects of the communication between the base station 110, 111, 114 and the remote station 123-127. The base station 110, 111, 114 uses the control channel to send to the remote station 123-127 training sequence code (TSC) which indicates which of a set of sequences the base station 110, 111, 114 will use to transmit the signal to the remote station 123-127. In GSM, a 26-bit training sequence is used for equalization. This is a known or prescribed sequence which is transmitted in a signal in the middle of every burst. Referring back to FIG. 3, the training sequence is transmitted in the 26-bit midamble located in the middle of the burst illustrated in the lower portion of FIG. 3.

The remote station includes a sequence identifier which identifies the sequences as training sequences of a time division multiple access communication system. The sequence identifier may be implemented in hardware and/or software. Its principles of operation are well known and need not be described in detail. The sequences are used by the remote station 123-127 to: compensate for channel degradations which vary quickly with time; reduce interference from other sectors or cells; and synchronize the remote station's receiver to the received signal. These functions are performed by an equalizer which is part of the receiver of the remote station 123-127. The equalizer determines information regarding how the known transmitted training sequence signal is modified by multipath fading.

The equalizer may use this information to extract the desired signal from unwanted multipath reflections of the signal by constructing an inverse filter to extract parts of the desired signal which have been corrupted by multipath fading. Different sequences (and associated sequence codes) are transmitted by different base stations 110, 111, 114 so that the equalizer of a remote station can reduce interference between sequences transmitted by base stations 110, 111, 114 that are close to each other.

A remote station 123-127 which comprises a receiver having enhanced co-channel rejection capability is able to use the sequences to distinguish a wanted signal transmitted by a particular base station 110, 111, 114 from other unwanted signals transmitted by other base stations 110, 111, 114. This holds true so long as the received amplitudes or power levels of the unwanted signals are below a threshold relative to the amplitude of the wanted signal.

The unwanted signals can cause interference to the wanted signal if they have amplitudes above this threshold. The threshold can vary according to the capability of the remote station's 123-127 receiver. The interfering signal and the desired (or wanted) signal can arrive at the remote station's 123-127 receiver contemporaneously if, for example, the signals from the serving and non-serving base stations 110, 111, 114 share the same time slot for transmitting.

Recent efforts to improve receivers to cope with interfering signals have resulted in a specified standard of advanced receiver capability known as downlink advanced receiver performance (DARP). DARP is described in cellular standards defining the GSM system.

A remote station 123-127 which has enhanced co-channel rejection capability is able to use the training sequences in a wanted signal and an unwanted co-channel signal and to demodulate and use the wanted signal, when the amplitudes of the wanted and unwanted signals are similar. Such a mobile station will treat the unwanted signal as co-channel interference (CCI) and reject the interference.

Two transmitted independent data streams may be intended for two or more different receiving apparatus (receivers) which may be paired by means of operation known as Voice services over Adaptive Multi-user on One time slot (VAMOS) operation. According to VAMOS operation, the two independent data streams are both transmitted on the same physical channel (that is, on the same frequency and in the same time slot.) For example a set of time slots can be located in multiple frames, each time slot having the same time slot number. The set of time slots may include time slot 3 in every frame of the multiple frames.

A VAMOS-enabled receiver has DARP capability and is therefore capable of receiving and processing both data streams on the same physical channel, even when it receives its own data at a similar power level to the level at which it receives the data transmitted for another receiver. The receiver can decode the data stream intended for it, whilst rejecting the other data stream as interference. Alternatively, two independent data streams may be transmitted on the same physical channel and may be intended for the same receiver, the receiver being capable of receiving and processing both data streams.

The number of data streams allocated to a time slot may vary with time, for example on a frame-by-frame basis or a burst-by-burst basis. For example, the number of data streams allocated to the time slot will vary with time during discontinuous transmission (DTX) operation as will now be described.

A full-rate data stream may be transmitted on the single physical channel for a first receiver of two VAMOS-enabled receivers and a half-rate data stream is transmitted on the same channel for a second receiver using DTX. During odd-numbered frames only the full-rate data stream is transmitted in a prescribed time slot (e.g. time slot 3) for the second receiver, and the half-rate data is not transmitted. During these time slots of the odd-numbered frames the first receiver receives the signal which contains only the full-rate data stream during that time slot.

Therefore the first receiver, in order to decode the single data stream, does not need to perform as much processing on its received signal during that time slot in which the signal contains only the full-rate data stream, as it would if it received both data streams in the same time slot.

The first receiver needs to perform more processing on its received signal during even-numbered frames in order to decode its own full-rate data stream in the presence of the half-rate data stream which acts as interference for the first receiver.

It should be apparent that what is described above for even numbered frames and odd numbered frames respectively can equally well apply to odd numbered frames and even numbered frames respectively.

Figure 5:
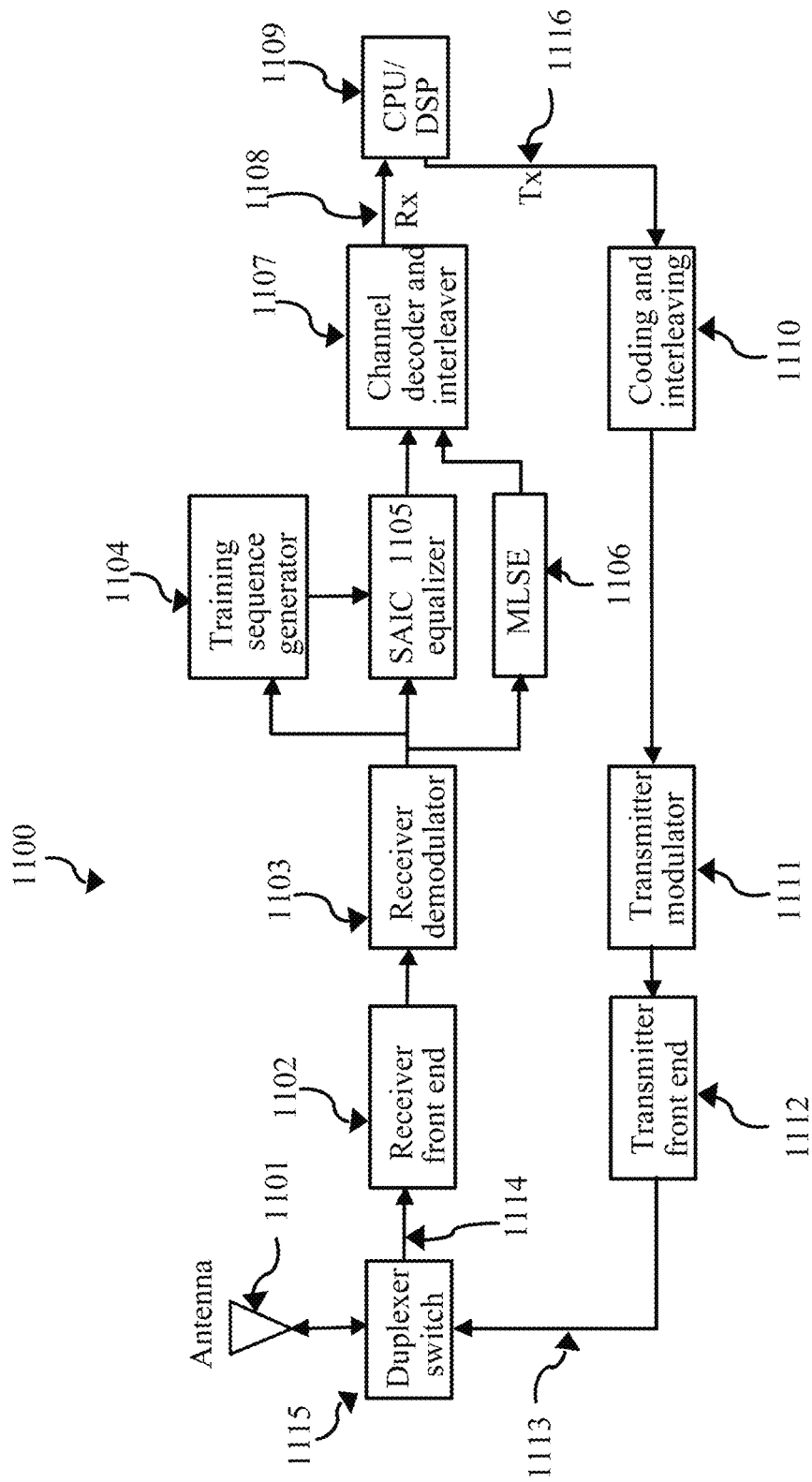
FIG. 5 is a schematic diagram illustrating a transceiver for a remote station having enhanced co-channel rejection capability according to some embodiments of the present invention.

FIG. 5 is a schematic diagram illustrating a transceiver 1100 for a remote station having enhanced co-channel rejection capability. A signal comprising data is provided by means of antenna 1101 and duplexer switch 1115 to a receiver front end 1102. The receiver front end 1102 serves to filter, amplify and downconvert the signal to produce a downconverted signal. A demodulator 1103 serves to demodulate the downconverted signal to produce a demodulated signal.

The transceiver 1100 comprises a single antenna interference cancellation (SAIC) equalizer 1105 and a maximum likelihood sequence estimator (MLSE) equalizer 1106. The transceiver 1100 is adapted to use either the single antenna interference cancellation (SAIC) equalizer 1105, or the maximum likelihood sequence estimator (MLSE) equalizer 1106 under the control of a central processing unit, CPU 1109 and according to instructions stored in a memory coupled to the CPU (the memory is not shown in the figure). The SAIC equalizer is preferred for use when two signals having similar amplitudes are received. The MLSE equalizer is typically used when the amplitudes of the received signals are not similar, for example when the wanted signal has an amplitude much greater than that of an unwanted co-channel signal.

The SAIC equalizer and the MLSE equalizer are each configured to perform channel estimation and equalization of the demodulated signal to produce an equalized signal, using training sequences produced by a training sequence generator 1104. The equalized signal is fed to a channel decoder and interleaver 1107 which serve to decode and de-interleave the equalized signal to produce decoded and de-interleaved data and to output the decoded and de-interleaved data to the CPU 1109.

The demodulating of the received signal may include adaptive quadrature phase shift keying, known also as AQPSK. According to AQPSK modulation, the mapping between modulating bits and modulated quaternary symbols is given by the values in Table I below.

TABLE I

| Modulating bits for $a_i$, $b_i$ | AQPSK symbol in polar notation $s_i$ |
| --- | --- |
| (0, 0) | $e^{j\alpha}$ |
| (0, 1) | $e^{-j\alpha}$ |
| (1, 0) | $-e^{-j\alpha}$ |
| (1, 1) | $-e^{j\alpha}$ |

The ratio of power, expressed in dB, between the quadrature (Q) and in-phase (I) channels is chosen to be: $20 \cdot \log 10 (\tan \alpha)$ The operations of the antenna 1101, duplexer switch 1115, receiver front end 1102, receiver demodulator 1103, single antenna interference cancellation (SAIC) equalizer 1105, MLSE equalizer 1106, training sequence generator 1104, and channel decoder and interleaver 1107 are well known and need not be described in any further detail.

Data to be transmitted by the transceiver is coded and interleaved by a coding and interleaving unit 1110 to produce coded and interleaved data. The coded and interleaved data is input to a modulator 1111 which serves to modulate the coded and interleaved data to produce modulated data. A transmitter front end 1112 is configured to filter, amplify and upconvert the modulated data to produce transmit data. The transmit data is transmitted via the duplexer switch 1115 and the antenna 1101. The operations of the coding and interleaving unit 1110, the modulator 1111 and the transmitter front end 1112 are well know and need not be described in further detail.

Figure 6:
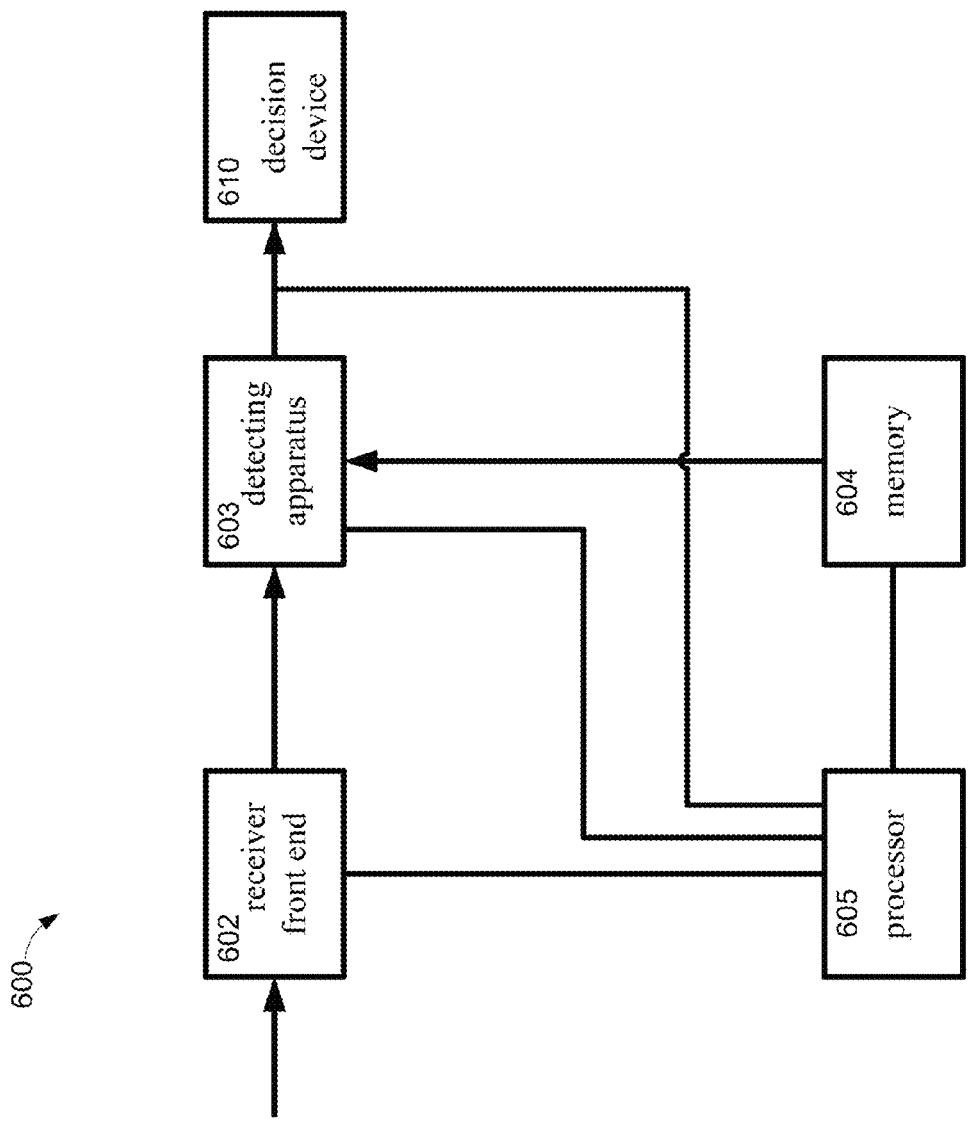
FIG. 6 is a schematic diagram of a receiving apparatus for detecting data streams in a communication system according to some embodiments of the present invention.

FIG. 6 is a schematic diagram of a receiving apparatus 600 for detecting data streams in a communication system. The receiving apparatus generally comprises a receiver front end 602, a detecting apparatus 603 coupled to the receiver front end 602, a memory 604, a processor 605, and a decision device 610 coupled to the detecting apparatus. The processor 605 is in electronic communication with the memory 604 and is coupled to, and configured to control the operation of, the receiver front end 602, the detecting apparatus 603, and the decision device 610.

The receiver front end 602 is configured to receive modulated data transmitted on a single physical channel. The modulated data may be provided to the receiver front end 602 by one or more antennas (not shown). The modulated data may comprise one or more data streams. For example, the data may comprise independent data streams intended for individual remote stations of the wireless communication system. The receiver front end 602 is further configured to demodulate the received modulated data to produce demodulated data. The demodulated data is provided to the detecting apparatus 603.

The detecting apparatus 603 is configured to detect data streams in the demodulated data and to provide an indication of the data streams likely contained in the signal.

The indication is provided to the decision device 610 which may form part of the processor 605. The decision device 610 serves to provide a receiver configuration, based on the indication, for use by the receiving apparatus 600, the receiver configuration including a decoder configuration for use by a decoder 620 (not shown). The receiver configuration may be used in a receiver comprising the receiving apparatus 600 to configure a decoder so that the decoder decodes only the one or more detected data streams indicated as being likely contained in the signal.

Figure 7:
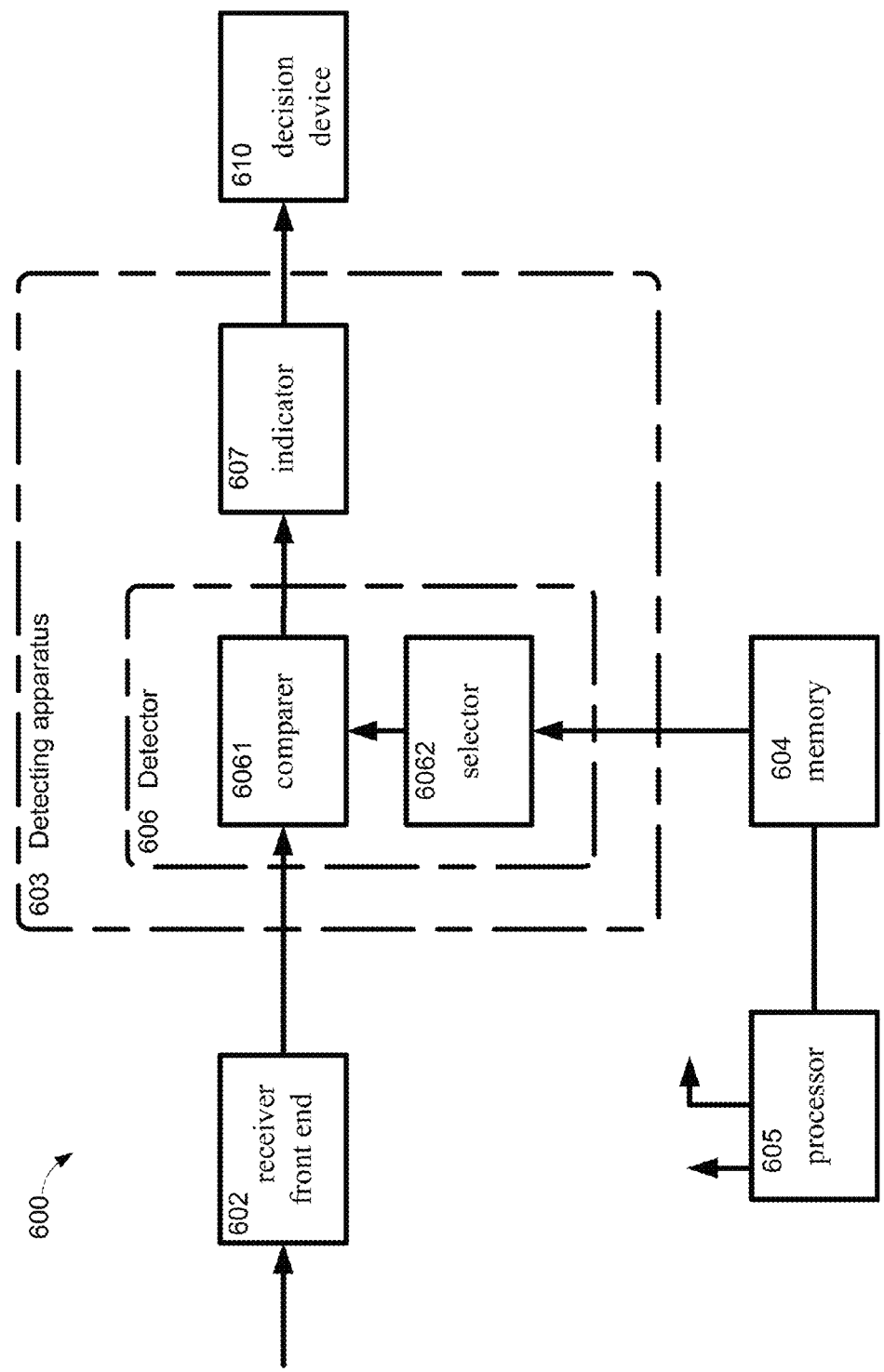
FIG. 7 is a more detailed schematic diagram of the receiving apparatus of FIG. 6.

FIG. 7 is a more detailed schematic diagram of the receiving apparatus 600 of FIG. 6 showing an example arrangement of the detecting apparatus 603. The receiving apparatus comprises a receiver front end 602, a detecting apparatus 603 coupled to the receiver front end 602, an indicator 607 coupled to the comparer 6061, a decision device 610 coupled to the indicator, a memory 604, and a processor 605. The functions of the receiver front end 602, detecting apparatus 603, decision device 610, memory 604 and processor 605 shown in FIG. 7 are the same as the functions shown in FIG. 6 having the same reference numerals.

The detecting apparatus 603 comprises a detector 606 coupled to the receiver front end 602 and configured to detect a number of data streams contained within the received signal. The detector 606 can detect data streams by comparing a received signal with plural predetermined sequences and identifying one or more of the plural predetermined sequences as being likely contained within the signal, each data stream being associated with a predetermined sequence.

The detector 606 comprises a comparer 6061 coupled to the demodulator 602 and a selector 6062 coupled to the comparer 6061. The memory 604 is configured to store a set of predetermined data sequences.

The selector 6062 is coupled to the memory 604. Under the control of processor 605 the selector 6062 selects a data sequence from the set of predetermined data sequences stored in the memory 604 to produce a selected sequence. The comparer 6061 is configured to identify a sequence as being likely contained within the signal by comparing at least part of the demodulated data with the selected sequence produced by the selector 6062. This can produce a comparison result corresponding to a likelihood that the demodulated data contains the selected sequence.

The detecting apparatus also comprises an indicator 607 coupled to the detector 606. The indicator 607 can be configured to provide an indication of the data streams that are likely contained in the signal by using the comparison results for the plural sequences provided by the detector 606.

The decision device 610 provides data defining a receiver configuration based on the indication provided by the indicator 607. The receiver configuration data may be used to configure a decoder (not shown in the figure) so that the decoder decodes only the one or more data streams indicated as being likely contained in the signal.

The detector 606 is configured to detect data streams comprising traffic data and/or control data. The VAMOS level 2 specification includes an option to intentionally transmit control data (slow associated control channel, or SACCH data) together with traffic data within the same burst (i.e., the same time slot). The data in the burst can include data for more than one mobile station or user. The detector is able to operate on bursts of data containing control channel data and/or traffic data (the traffic data comprising voice data and/or packet data). The detector can therefore operate on all available data and not just on traffic data. The receiver can be adapted more continuously and for more of the time than if only traffic data were used for the detection.

Figure 8:
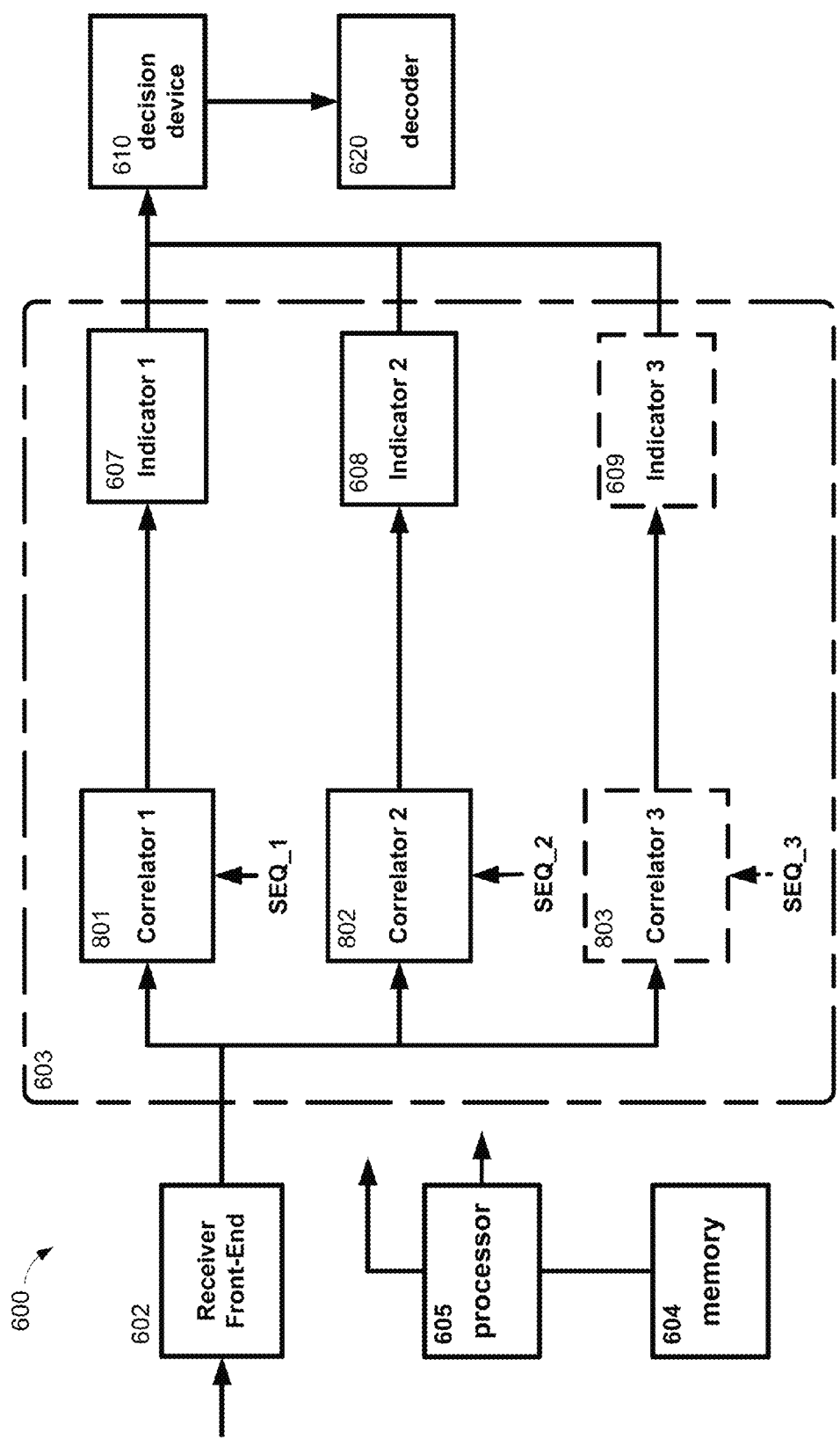
FIG. 8 is a schematic diagram of a receiving apparatus for detecting data streams in a communication system in parallel or in series according to some embodiments of the present invention.

FIG. 8 is a schematic diagram of a receiving apparatus 600 for detecting data streams in a communication system wherein the detection may be performed in parallel or in series. A receiver front end 602 serves to receive, filter, downconvert and demodulate a signal transmitted on a single physical channel, the signal containing modulated data, to produce demodulated data. A detecting apparatus 603 coupled to the receiver front end 602 is configured to detect one or more data streams likely contained within the demodulated data and to provide an indication of data streams likely contained in the demodulated data. A decision device 610, coupled to the detecting apparatus 603, is configured to configure the receiving apparatus 600 based on the indication provided by the detecting apparatus 603.

A decoder 620 is coupled to the decision device 610. The decoder 620 can be configured to decode the demodulated data using the receiver configuration data provided by the decision device 610. The receiver configuration includes a decoder configuration for use by the decoder 620.

The receiving apparatus 600 also comprises a memory 604 and a processor 605 which is coupled to the memory 604. The processor 605 can be configured to control the operation of the receiver front end 602, the detecting apparatus 603, the decision device 610, and the decoder 620 according to instructions contained in the memory 604. The memory 604 may be a stand-along memory or be on-board with the processor 605.

The detecting apparatus 603 can comprise a number of detection paths. Three detection paths are shown yet any number of paths may be used. Each detection path can operate the same way. They can also comprise a correlator 801 to 803 coupled to the receiver front end 602 and an indicator 607 to 609 coupled to the correlator 801 to 803.

The detection paths can have various arrangement features. For example, multiple detection paths (e.g., three paths) may operate in parallel or they may act sequentially or in series, one after another. In another arrangement, there may be only one detection path comprising correlator 801 and indicator 607. In this arrangement, the detection path can operate sequentially multiple times (e.g., three times) on the same demodulated data. With each sequential operation, the detection path can use a different training sequence.

Demodulated data produced by the receiver front end 602 is input to the correlator 801 to 803. A midamble or training sequence SEQ_1 to SEQ_3 is input to the correlator 801 to 803 from the memory 604 under the control of the processor 605. A different respective training sequence is input to the correlator of each respective path, each training sequence corresponding to a respective remote station.

The correlator 801 to 803 correlates the demodulated data using the training sequence SEQ_1 to SEQ_3 to produce a channel estimate. Any suitable correlation technique may be used, for example a direct correlation or least squares estimation (LSE). Once the channel has been estimated, the resulting channel estimate may be used to compute a quality metric such as channel energy and/or noise over the midamble. The noise can be measured as a quality parameter such as signal-to-noise ratio (SNR), i.e. the ratio of channel energy and the noise computed over the midamble. Either the channel energy or the SNR can be used to feed to the decision device 610.

The quality metric is an indication of the likelihood that the training sequence SEQ_1 to SEQ_3 is contained within the demodulated data. The quality metric is typically a "soft" value or "soft metric" having one of a range of values (e.g. 1 to 32) but it may be a 'hard' value (e.g. 1 or 0).

An indicator 607 to 609 is configured to provide an indication of whether a particular data stream is likely contained in the demodulated data based on the quality metric. The particular data stream corresponds to the training sequence SEQ_1 to SEQ_3 used input to the correlator 801 to 803. The indicator 607 to 609 may receive the quality metric as a soft metric and convert the soft metric into an indication having a 'hard' binary data value and indicating the likely presence or non-presence of the training sequence SEQ_1 to SEQ_3 in the demodulated data. Alternatively, the indicator 607 to 609 may simply provide the quality metric (e.g. soft metric) as the indication.

The indicator may provide channel energy or signal-to-noise ratio as the indication to the decision device 610. The decision device 610 may use either channel energy alone or signal-to-noise ratio from different data streams as a quality metric to make a determination regarding the data streams likely contained in the received signal. The decision device 610 may then modify a receiver configuration based on the determination. The decision device may be part of the processor 605.

The receiver configuration data may be used to configure a decoder 620. This can enable the decoder 620 to decode only the one or more data streams indicated as being likely contained in the signal. For example the decision device 610 may configure the decoder 620 based on how many training sequences are indicated as being likely contained in the demodulated data. The receiver configuration data may be used to configure the receiving apparatus 600 to further process the demodulated data (e.g. joint interference suppression, successive interference cancellation, etc.) based on a required service metric/threshold and based on quality metrics from different streams by means of the indications provided by the indicators 607 to 609.

If the length of a training sequence is small, under challenging RF scenarios (severe interference and/or fading), the estimate of channel energy and/or SNR (i.e. the metric), provided using the training sequence, may not be reliable enough for the decision device to change the receiver configuration effectively most of the time. For example, during a deep fade, the detector may be unable to detect the presence of a received training sequence in the demodulated data because the level of the received signal drops below a detection threshold during the fade.

If the duration of the received training sequence is less than or equal to the duration of the fade, then it is possible that the training sequence will be received mostly during the fade. Therefore false alarms and misdetection may be high under challenging RF scenarios when the length of the training sequence is small. It may not be possible to provide a longer training sequence due to system constraints and specified requirements of the communication system.

This issue may be addressed by performing interference cancellation on the correlated data output by the correlator 801 to 803. This technique is more expensive computationally but provides a more reliable metric for the decision device to use to configure the receiver.

Figure 9:
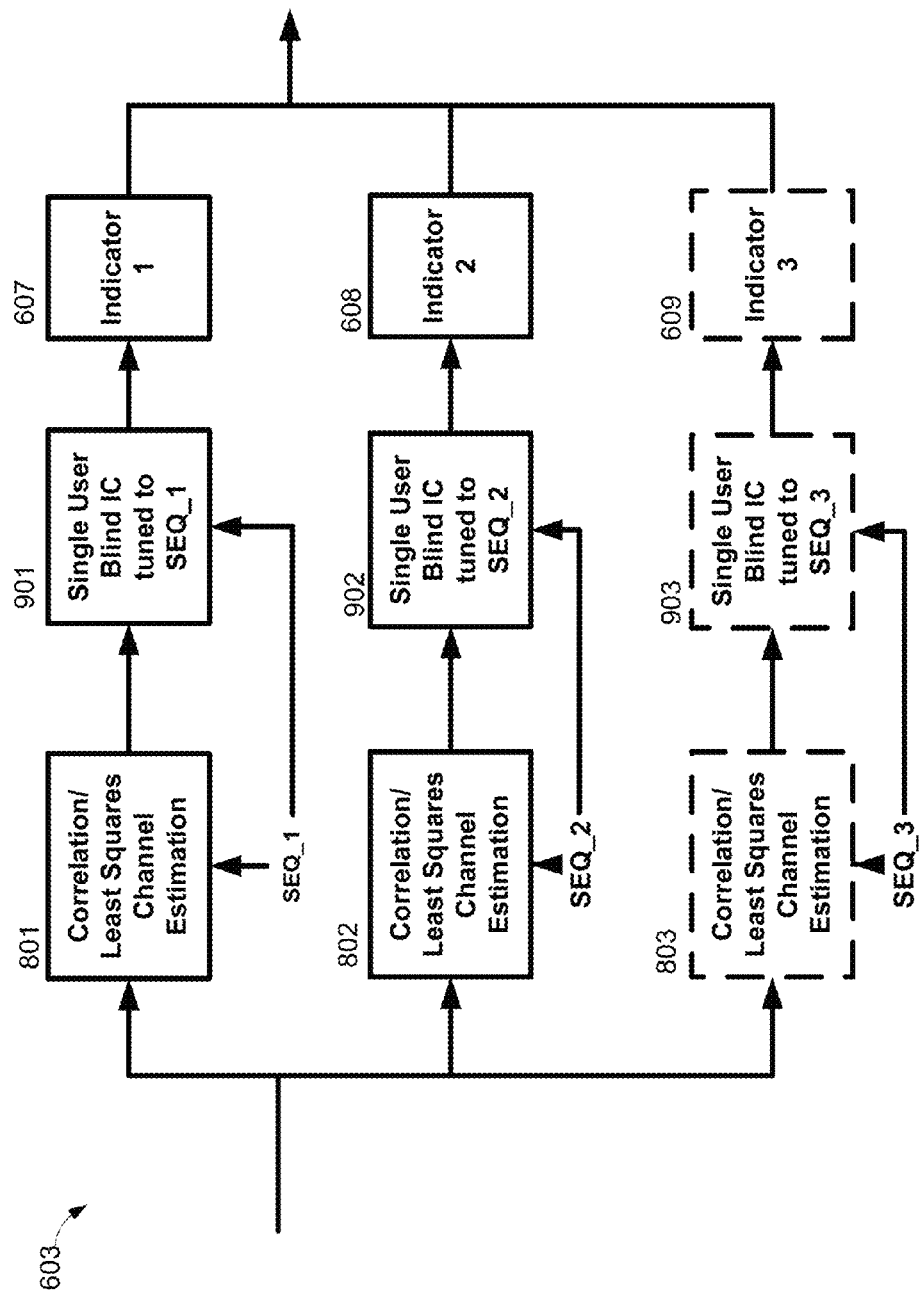
FIG. 9 is a schematic diagram of a detecting apparatus for detecting data streams in a communication system using interference cancellation according to some embodiments of the present invention.

FIG. 9 is a schematic diagram of a detecting apparatus 603 for detecting data streams in a communication system 100 using interference cancellation. The detecting apparatus 603 comprises a number of detection paths each comprising a correlator 801 to 803, an interference canceller 901 to 903 and an indicator 607 to 609. Each detection path operates the same way. Three detection paths are shown but it should be clear that any number of paths may be used. The detection paths may operate in parallel, or they may act sequentially or in series, one after another. Similarly, there may be only one detection path comprising correlator 801, interference canceller 901 and indicator 607, operating three times sequentially on the same demodulated data.

The correlator 801 to 803 is provided with demodulated data. The correlator 801 to 803 is also provided with a particular training sequence SEQ_1 to SEQ_3 corresponding to a remote station. The correlator 801 to 803 computes a channel estimate for the demodulated data. The correlator 801 to 803 computes the channel estimate based on direct correlation or least squares estimation using the particular training sequence SEQ_1 to SEQ_3. A channel estimate is output by the correlator 801 to 803 and input to the interference canceller 901 to 903.

The interference canceller 901 to 903 performs blind interference cancellation (IC) and equalisation on the demodulated data based on the channel estimate and using the particular training sequence SEQ_1 to SEQ_3 associated with a single user or mobile station of the communication system to produce interference-suppressed data. The indicator 607 to 609 is configured to measure a quality parameter of the interference-suppressed data and produce a quality metric such as signal-to-interference ratio (SIR). The indicator 607 to 609 provides an indication based on the quality metric. The indicator may provide the quality metric directly as the indication.

The decision device 610 modifies a receiver configuration for further processing (e.g. joint interference suppression, successive interference cancellation etc.) based on a required service metric/threshold and based on quality metrics from different streams, by means of the indications provided by the indicators 607 to 609.

The detecting apparatus of FIG. 9 requires more computation than the detecting apparatus of FIG. 8, but it can provide a more reliable indication or metric for use in configuring a receiver.

Figure 10:
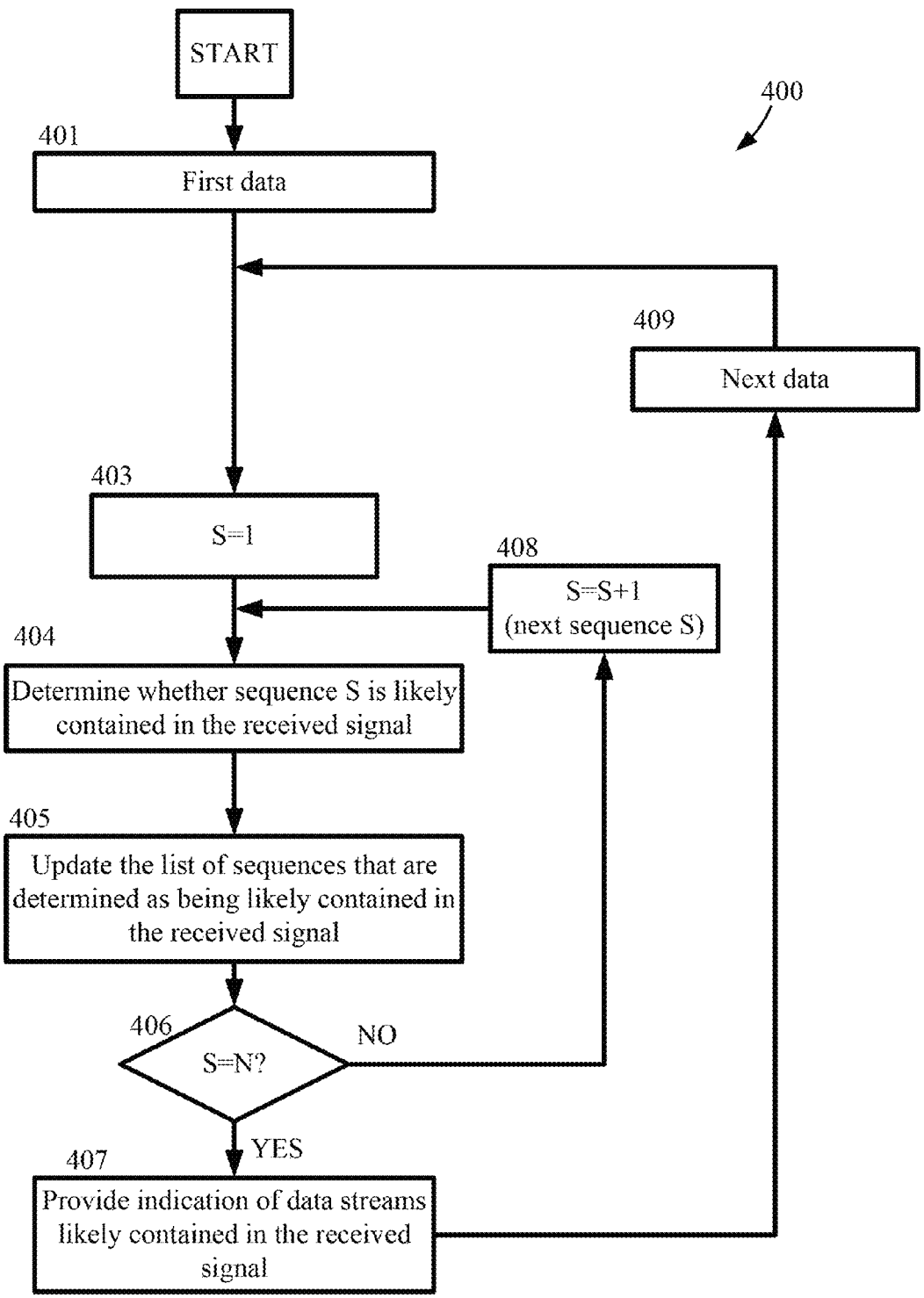
FIG. 10 is a flow diagram illustrating a process for carrying out a method of detecting data streams in a communication system according to some embodiments of the present invention.

FIG. 10 is a flow diagram illustrating a process for carrying out a method of detecting data streams in a communication system. In block 401 received data to be detected is input to the process or selected for detection. The received data may comprise more than one demodulated data for more than one user for example. In a simple case, there may be data for two users in the received signal. The data may comprise two data streams which could be intended for different users or intended for the same user.

In block 403 a variable sequence number S is assigned the value 1. The value 1 corresponds to a first sequence to be used.

In block 404 a determination is made as to whether a sequence corresponding to the sequence number S is likely contained in the received data. For example, when S=1 a determination is made as to whether a first sequence is likely contained in the received data. The determination may comprise comparing the received data with the sequence corresponding to S and then producing a metric based on the comparison, the metric serving as a measure of the likelihood that the received data contains the sequence corresponding to S. The metric may be a soft value or a hard decision value (e.g. either one or zero). A soft value typically has more than two possible values and may be a number within a range of numbers.

In block 405 a list of sequences, which may be stored in a memory, is updated according to the determination in block 404. The list indicates for each sequence a likelihood that the sequence is contained in the received data. For example, the list may contain a value for the metric obtained for each sequence. Alternatively the list is updated so that it lists a sequence as likely contained in the received data if the sequence is determined to be likely contained in the received data, and the list is updated so as not to list the sequence as likely contained in the received data if the sequence is determined to be not likely contained in the received data.

In block 406 a determination is made as to whether the sequence number S is equal to N, a predetermined number. N may be any number. N may correspond to the number of sequences in a set of sequences, or a number of sequences in a chosen subset of the set of sequences. N may be two or three, for example. N may be eight. N may be chosen or selected dynamically and may vary for different situations e.g. different noise environments or signal quality requirements. N may correspond to a number of sequences in a set of sequences which is specified for possible use in a telecommunications standard.

If the determination in block 406 is NO, then in block 408, S is incremented positively by integer 1. For example, S is increased from 1 to 2. The process then repeats at block 404.

If the determination in block 406 is YES, S=N, then in block 407 an indication is provided of the data streams detected as likely contained in the received data. Each data stream contains a prescribed sequence. The sequences detected as likely contained in the received data are already stored in the list which was updated in block 405. The memory containing the list may be cleared or erased once the indication has been provided in block 407. Optionally once the indication has been provided, the value N may be changed (not illustrated in the figure).

The process then progresses to block 409 in which more received data, or next data, is newly selected. The process then continues at block 403. The newly selected data and the previously-selected data may be data that are received during two different time intervals. The time intervals may be time slots of a frame or they may be two different frame periods corresponding to two frames of data. The iteration may be performed on a burst-by-burst basis, each burst corresponding to a time slot. Performing the iteration on a burst-by-burst basis during a voice/speech connection is advantageous because, for speech, latency should be minimised. On the other hand, for packet data latency is allowable and so packet data may be received and demodulated during several time intervals (for example consecutive time intervals) and then processed.

In the case of packet data the method may iterate so that demodulated data which was received during a next time interval of the several time intervals is processed in block 404. This iteration will continue until all the data received during the several time intervals has been processed by blocks 404-407. The method may then continue so that new data is received (block 409).

It will be appreciated that it is possible to decode any number N of independent data streams, each data stream associated with a different prescribed data sequence.

Figure 11:
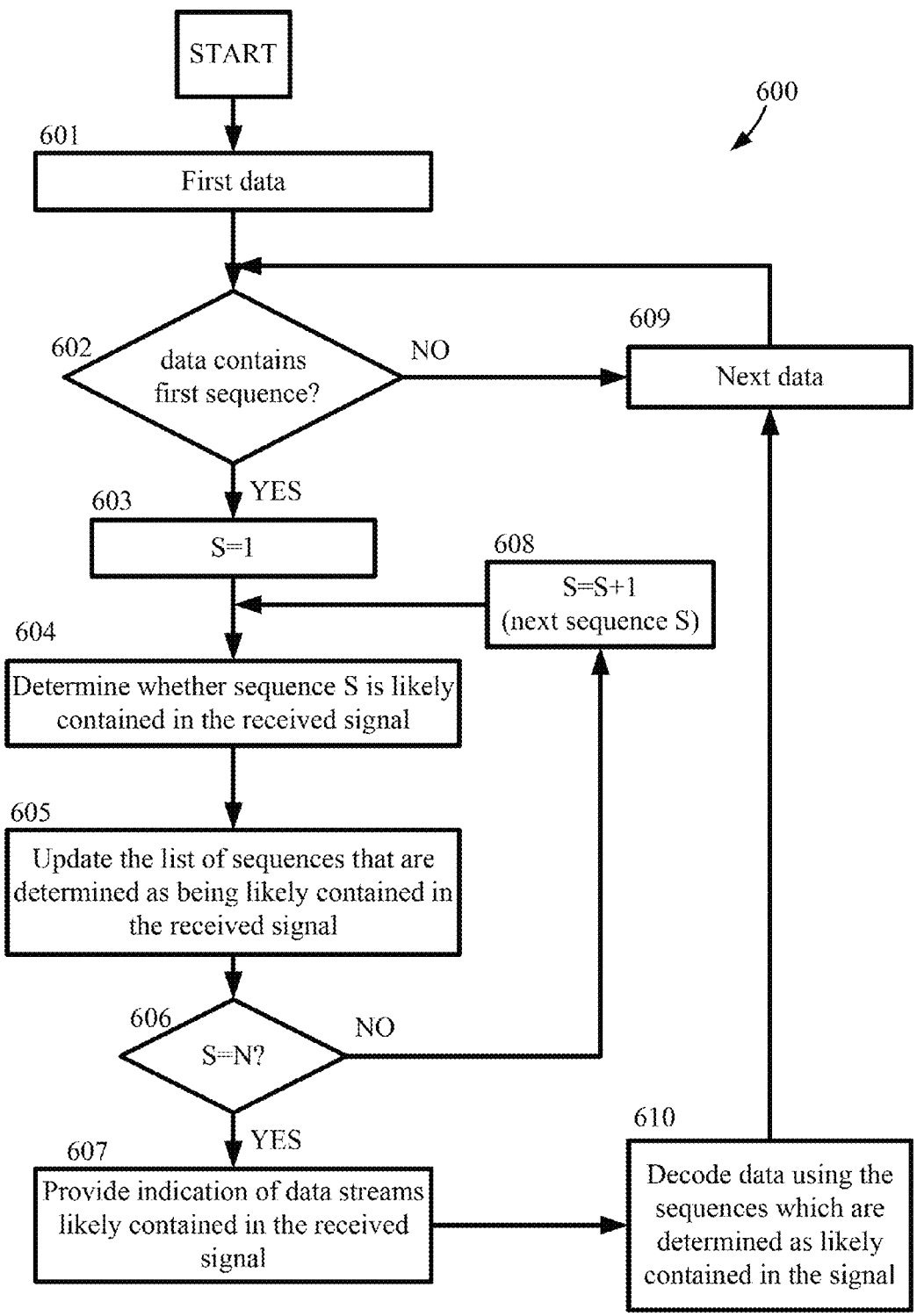
FIG. 11 is a flow diagram illustrating a method of detecting data streams in a signal and decoding the data streams that are determined as likely to be contained in the signal according to some embodiments of the present invention.

FIG. 11 is a flow diagram illustrating a method of detecting data streams in a signal and decoding the data streams that are determined as likely to be contained in the signal. The method may be carried out by a mobile station which receives the signal. In block 601 received data to be detected is selected for detection. The received data may comprise more than one demodulated data for more than one user for example. In a simple case, there may be data for two users in the received data.

In block 602 a determination is made as to whether the received data contains a first predetermined sequence. For example the first predetermined sequence may be a particular predetermined sequence associated with, and assigned for use by, the mobile station which receives the signal. During registration and call set-up, a mobile station is always assigned a training sequence by the network for the mobile station to use in decoding data.

If the determination is NO, then in block 609 next data is newly selected for detection. The newly selected data and the previously selected data may be data that are received during two different time intervals. The time intervals may be time slots of a frame or they may be two different frame periods corresponding to two frames of data, for example. The iteration may be performed on a burst-by-burst basis, each burst corresponding to a time slot. The newly selected data may be newly-received data different than the previously selected data. Alternatively, the newly received data may be newly-selected data of an amount of received data which includes the previously-selected data. For example the amount of received data may be a frame of data, the previously selected data may be one burst/time slot of the frame and the newly selected data may be another burst/time slot of the frame. Alternatively the amount of received data may be plural frames of data, the previously selected data may be one frame of the plural frames and the newly selected data may be another frame of the plural frames of data. The process then progresses again to block 602 wherein a determination is made as to whether the newly selected data contains the first predetermined sequence.

If the determination in block 602 is YES, then the process continues at block 603.

In block 603 a variable sequence number S is assigned the value 1. The value 1 corresponds to a first sequence to be used. S could alternatively be equal to 2 or another number.

In block 604 a determination is made as to whether a sequence corresponding to the sequence number S is likely contained in the received data. For example, when S=2 a determination is made as to whether a second sequence is likely contained in the received data. The determination may comprise comparing the received data with the sequence corresponding to S and then producing a metric based on the comparison, the metric serving as a measure of the likelihood that the received data contains the sequence corresponding to S. The metric may be a soft value or a hard decision value (e.g. either one or zero). A soft value typically has more than two possible values and may be a number within a range of numbers.

In block 605 a list of sequences, which may be stored in a memory, is updated according to the determination in block 604. The list indicates, for each sequence, the likelihood that the sequence is contained in the received data. For example, the list may contain a value for the metric obtained for each sequence. Alternatively, the list is updated to list, or not list, a sequence as likely contained in the received data if the sequence is determined as likely to be, or likely not to be, contained in the received data respectively.

In block 606 a determination is made as to whether the sequence number S is equal to N, a predetermined number. N may be any number. N may correspond to a number of sequences in a set of sequences, or a chosen subset of a set of sequences. N may be chosen or selected dynamically and may vary for different situations e.g. different noise environments or signal quality requirements. N may correspond to a number of sequences in a set of sequences which is specified for possible use in a telecommunications standard. N may be eight.

If the determination in block 606 is NO, then in block 608, S is incremented positively by integer 1. For example, S is increased from 1 to 2. The method then continues at block 604.

If the determination in block 606 is YES, S=N, then in block 607 an indication is provided of the likelihood that data streams detected are contained in the received data, based on the updated list provided by block 605. The memory containing the list may be cleared or erased once the indication has been provided in block 607. Optionally once the indication has been provided, the value N may be changed (not illustrated in the figure). The process then progresses to block 610.

In block 610 the selected data is decoded using the sequences which are determined as being likely contained in the received signal, and not using sequences which are determined as being unlikely contained in the received signal. The process then progresses to block 609 in which more received data, or next data, is selected, as described above. The process then continues at block 602. The iteration may be performed on a burst-by-burst basis, each burst corresponding to a time slot.

It will be appreciated that it is possible to decode any number of independent data streams, each data stream associated with a different prescribed data sequence.

When using the method for speech, latency should be minimised and therefore the method may iterate at block 609 so that new data is received during successive time intervals, e.g. consecutive time slots. On the other hand, for packet data latency is allowable and so data may be received and demodulated during several consecutive time intervals and then processed. In this case the method may iterate so that demodulated data which was received during a next time interval is demodulated. This iteration will continue until all the data received during a prescribed number of time intervals has been detected. The method may then continue so that new data is received.

It should be appreciated that plural detections of data sequences in block 604 may be done in parallel, in keeping with FIGS. 8 and 9, although FIGS. 10 and 11 illustrate detection of N sequences being performed iteratively in series.

Figure 12:
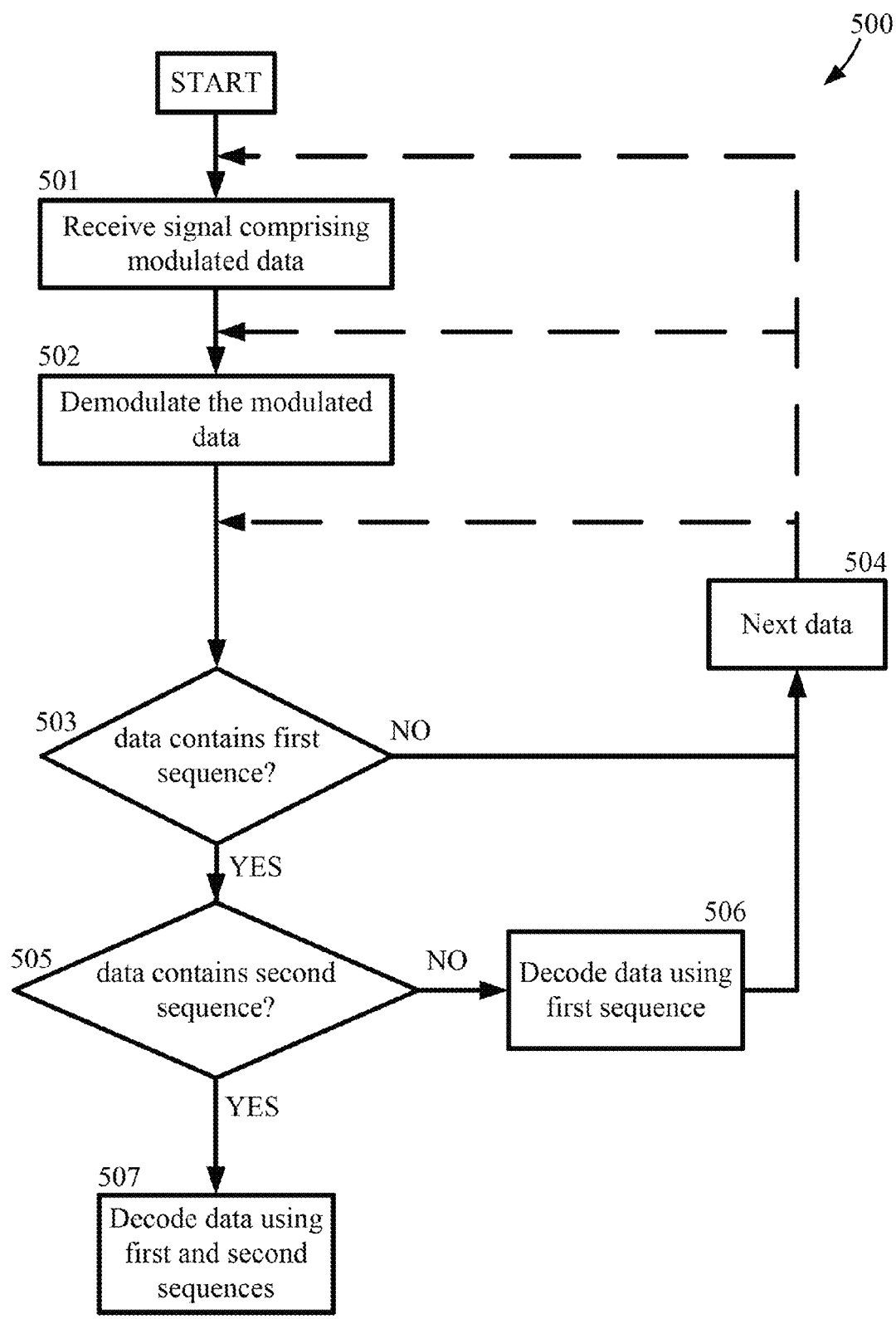
FIG. 12 is a flow diagram illustrating a method of detecting and decoding one or two data streams in a received signal according to some embodiments of the present invention.

FIG. 12 is a flow diagram illustrating a method of detecting and decoding one or two data streams in a received signal. In block 501 a signal is received which comprises modulated data. In block 502 the received modulated data is demodulated. In block 503 a determination is made as to whether the received demodulated data contains a first data sequence.

The determination may comprise correlating the demodulated data with the data sequence to produce a correlation value. The determination may comprise partial decoding of the demodulated data. The determination may comprise partial decoding of the demodulated data and determining a metric of the partially decoded data such as signal-to-noise ratio or correlation ratio.

If the determination in block 503 is YES, then in block 505 a determination is made as to whether the received data contains a second sequence. If the determination in block 505 is NO, then in block 506 the data is decoded using the first sequence and not the second sequence. It should be clear that in order to decode data, the data may be stored then decoded. It will be well understood that it is common practice to store data prior to operating on the data. If the determination in block 505 is YES, then in block 507 the data is decoded using the first sequence and decoded using the second sequence.

Optionally, a partial iteration may be performed. If the determination in block 503 is NO, then according to block 504, at least part of the method is carried out for new data. The dashed arrows output from block 504 indicate that the method can be reinitiated by receiving new data (block 501), or by demodulating (block 502) new data of the data received in block 501, or by making a determination in block 503 based on new demodulated data produced in block 502.

Knowledge of which data streams are likely present in a received signal allows a receiving apparatus to be configured to decode only the data streams that are determined as likely to be present and allows the decoder to be optimised according to how many data streams are present. More processing power and/or memory may be required to decode two data streams than to decode a single data stream for example. During a time interval in which two data streams are allocated, it is required to decode both of the data streams. Therefore the receiver performs decoding of each of the data streams, because the receiver has determined that the number of allocated data streams is at least two for that time interval.

On the other hand, if the receiver has determined there is only one data stream likely contained in the signal, it will only decode the one data stream.

As described above, a receiver may perform decoding of data during a time interval so that the amount of processing used in the decoding is dependent on a number of data streams determined as being present in the received signal for the time interval. The receiver may be configured, having determined the number of data streams that are present in the received signal, to perform decoding of only the data streams which are determined as present and not perform decoding of any other data stream. An advantage of doing this is that the decoder's parameters may be adjusted according the number of data streams that are determined to be present in the signal.

Optionally, the decoding of the data in block 610 of FIG. 11 and block 506 of FIG. 12 may be performed using an amount of processing which depends on the number of sequences which have been determined as being present in the received signal. For example, the amount of processing may be less when only one sequence has been determined as being present in the received signal, than when two sequences have been determined as being present. This saves resource such as power consumption and memory usage.

Figure 13:
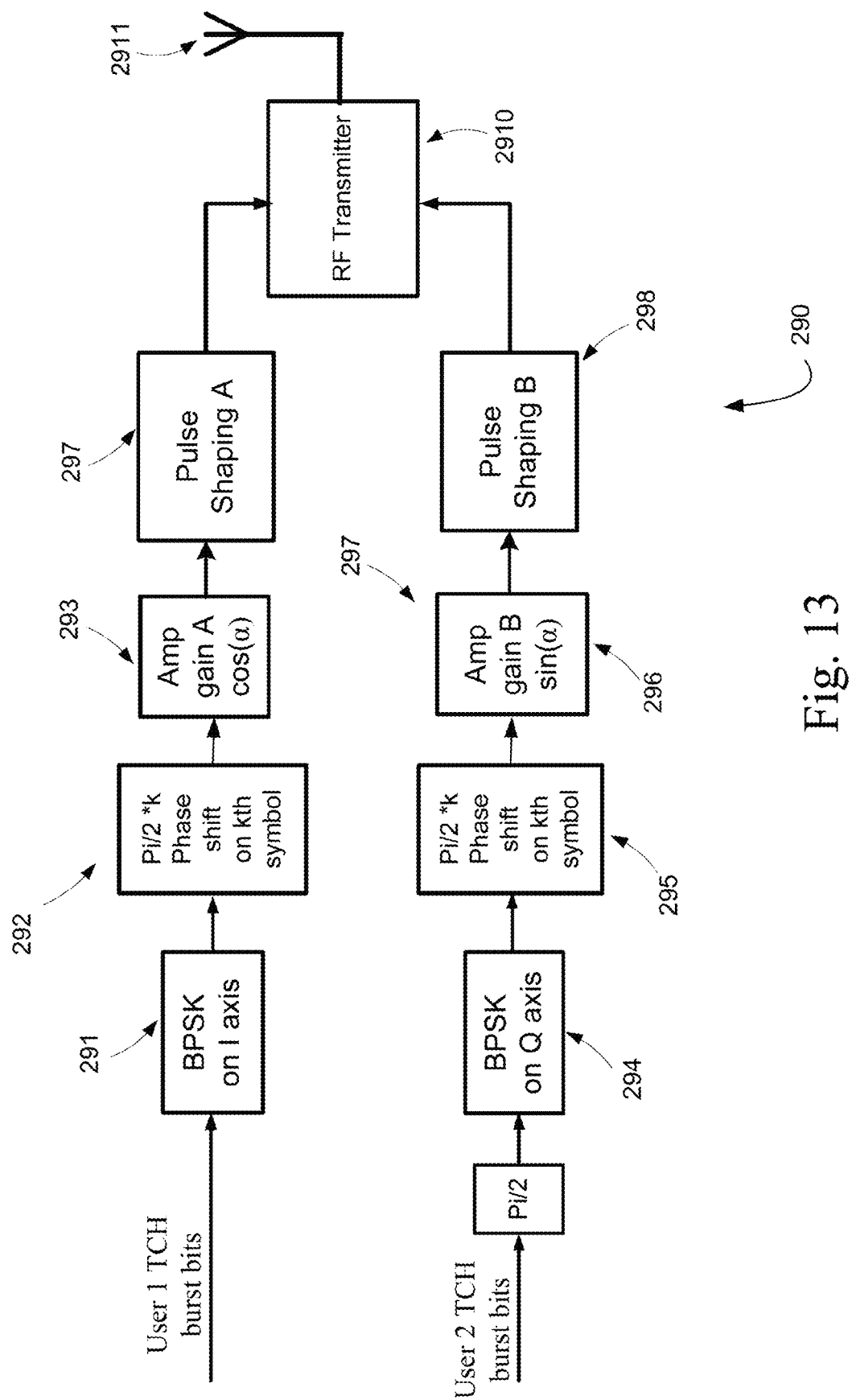
FIG. 13 is a schematic diagram illustrating a transmitting apparatus for combining and transmitting two signals to produce an adaptive QPSK-modulated, phase-rotated signal according to some embodiments of the present invention.

FIG. 13 is a schematic diagram illustrating a transmitting apparatus 290 for combining and transmitting two signals to produce one adaptive QPSK-modulated, phase-rotated combined signal. Each signal to be combined may comprise one of two independent data streams. The transmitting apparatus may be used to transmit the combined signal on a single physical channel, the combined signal comprising the two independent data streams.

A first input signal comprising a first sequence of baseband symbols is input to a first BPSK modulator 291. The modulator 291 is configured to BPSK modulate the first input signal to produce a first BPSK-modulated signal. A first phase rotator 292, coupled to the first BPSK modulator 291, is configured to increment the phase of the first BPSK-modulated signal by a prescribed phase increment, in this example 90 degrees (pi/2 radians), on every symbol of the first sequence of symbols, to produce a first phase-shifted signal. A first amplifier 293, coupled to the first phase rotator 292, is configured to amplify the first phase-shifted signal by a first prescribed gain to produce a first amplified signal. In this example, the gain is shown as A, which is equal to the cosine of alpha ($\alpha$). A first pulse-shaping filter 297, coupled to the first amplifier 293, is configured to low-pass filter the first amplified signal to produce a first filtered baseband signal.

A second input signal comprising a second sequence of symbols is input to a second BPSK modulator 294. The modulator 294 is configured to BPSK modulate the second input signal to produce a second BPSK-modulated signal. A second phase rotator 295, coupled to the second BPSK modulator 294, is configured to increment the phase of the second BPSK-modulated signal by a prescribed phase increment, in this example 90 degrees (pi/2 radians), on every symbol of the second sequence of symbols, to produce a second phase-shifted signal. A second amplifier 296, coupled to the second phase rotator 295, is configured to amplify the second phase-shifted signal by a second prescribed gain to produce a second amplified signal. In this example, the gain is shown as B, which is equal to the sine of alpha ($\alpha$). A second pulse-shaping filter 298, coupled to the second amplifier 296, is configured to low-pass filter the second amplified signal to produce a second filtered baseband signal.

A radio frequency (RF) transmitter circuit 2910, coupled to the first and second pulse shaping filters 297, 298 is configured to modulate, combine, amplify and transmit the first and second filtered baseband signals to produce a combined, QPSK-modulated signal. In this example, the RF transmitter circuit 2910 quadrature modulates the first and second filtered baseband signals so that the first filtered baseband signal forms an in-phase input, and the second filtered baseband signal forms a quadrature input, of an I-Q modulator. An antenna 2911 serves to transmit the combined, QPSK-modulated signal by means of radiation.

The operations of the elements 291 to 2911 shown in the figure are controlled by a microprocessor (not shown) which is coupled to a solid state memory (not shown). The microprocessor is operable to control the elements 291 to 2911 according to instructions stored in the memory.

Figure 14:
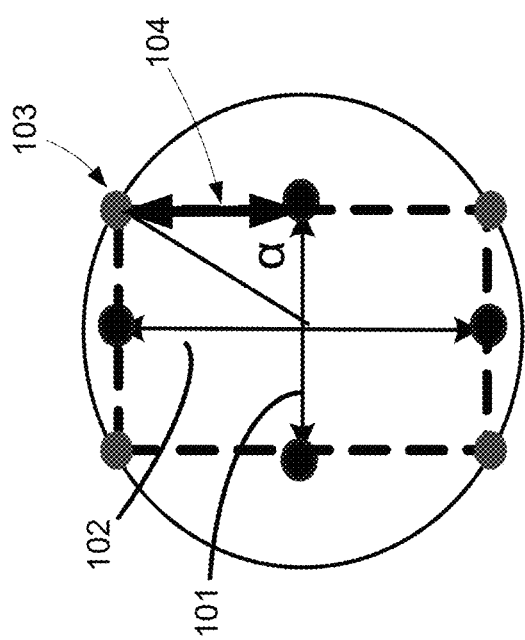
FIG. 14 is a diagram illustrating an adaptive QPSK constellation of a signal transmitted by the transmitting apparatus of FIG. 13 according to some embodiments of the present invention.

FIG. 14 is a diagram illustrating an adaptive QPSK constellation of a signal transmitted by the transmitting apparatus of FIG. 13. A signal for a first user is represented by the horizontal component (I component) 101 of the constellation points. A signal for a second user is represented by the vertical component (Q component) 102 of the constellation points. For example the Q component of constellation point 103 is the length 104. The ratio of amplitudes of the Q and I signals is equal to tan a, a being shown in the figure as the acute angle between the horizontal axis and the line joining the origin to the constellation point 103.

Figure 15:
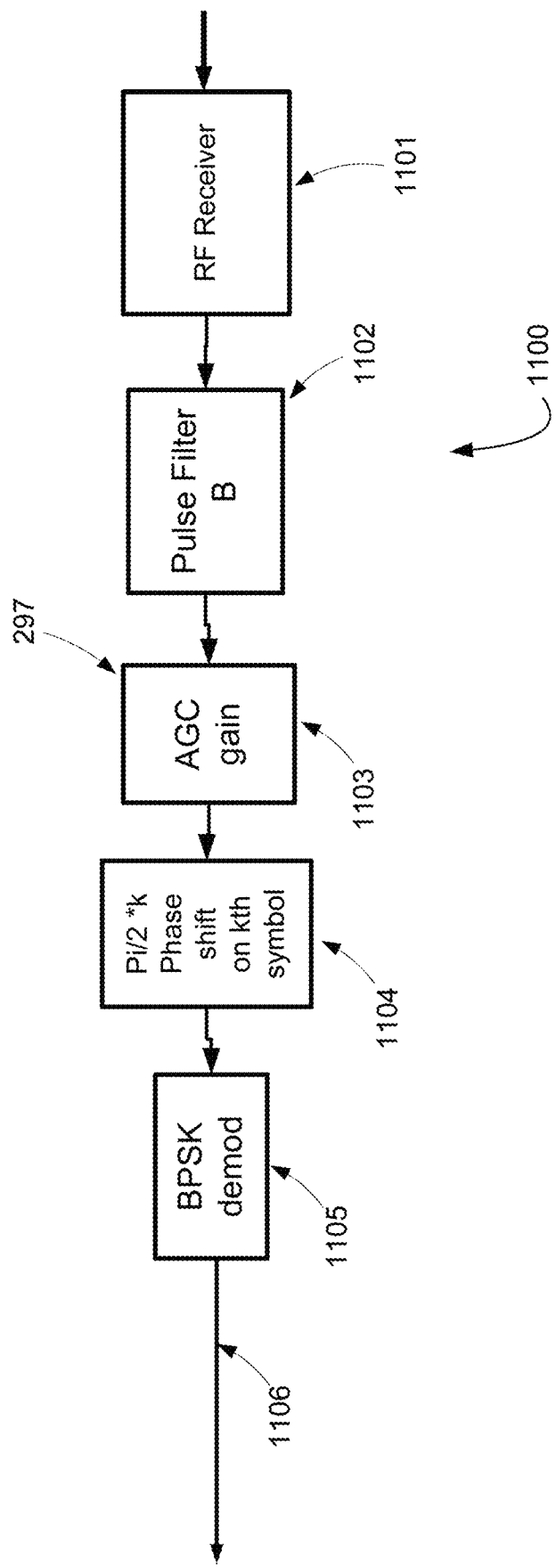
FIG. 15 is a schematic diagram of a receiving apparatus for receiving and demodulating a signal transmitted by the transmitting apparatus of FIG. 13 according to some embodiments of the present invention.

FIG. 15 is a schematic diagram of a receiving apparatus 1100 for receiving and demodulating a signal transmitted by the transmitting apparatus of FIG. 13. The receiving apparatus may be a mobile station of a cellular communications system. The transmitted signal may have the constellation shown in FIG. 14.

A radio frequency (RF) receiver 1101 receives and down-converts a signal comprising one or more modulated data streams transmitted on a single physical channel, to produce baseband data. A pulse filter 1102 acts to filter the baseband data. An AGC gain block 1103 applies a gain to the filtered baseband data to produce a gain adjusted signal. A phase shifter 1104 acts to apply a cumulative pi/2 or 90 degrees phase shift on each symbol of the gain adjusted signal relative to the previous symbol, to produce a phase-shifted signal. A binary phase shift keying (BPSK) demodulator 1105 serves to BPSK demodulate the phase shifted signal to produce demodulated data 1106.

The functions described herein may be implemented in hardware, software, firmware, or any combination thereof. The functions may be stored on a computer-readable medium or transmitted as one or more instructions or code over a computer-readable medium. Computer-readable media include any available medium that can be accessed by a computer or that facilitates transfer of a computer program or code in the form of instructions or data structures from one entity to another entity or from one place to another place. Computer-readable media include, but are not limited to, computer storage media, communication media, memory, optical storage, magnetic storage, or a connection. For example, if software is transmitted from a website, server, or other remote source using a connection, that connection is included in the definition of computer-readable medium and can include but is not limited to coaxial cable, fiber optic cable, twisted pair, digital subscriber line (DSL), or wireless technologies such as infrared, radio, and microwave. The terms disk and disc as used herein include compact disc (CD), laser disc, optical disc, digital versatile disc (DVD), floppy disk and blu-ray disc and may comprise any means for reproducing data magnetically or optically. Combinations of the above types of media should also be included within the scope of computer-readable media.

The above description is given by way of example only. Modifications and variations such as may occur to those possessed of appropriate knowledge and skills may be made without departure from the spirit and scope of the invention as set forth in the appended claims and equivalents thereof.

We claim:

1. A receiving apparatus for detecting data streams in a communication system, the receiving apparatus comprising:
 a detecting apparatus comprising:
  a detector configured to detect, prior to initiating a decoding process, a number of data streams contained within a signal received on a single physical channel by comparing the received signal with plural predetermined sequences and identifying one or more of the plural predetermined sequences as being likely contained within the received signal, each data stream being associated with one of the plural predetermined sequences, at least one of the predetermined sequences being based on a training sequence assigned to a mobile station during registration of the mobile station in a network; and
  an indicator coupled to the detector and configured to provide an indication of the data streams likely contained in the received signal based on the identifying; and
 a decision device coupled to the detecting apparatus and configured to provide data defining a receiver configuration based on the indication, the receiver configuration being suitable for configuring a decoder to decode only the one or more data streams indicated as being likely contained in the received signal.

2. The receiving apparatus of claim 1, wherein the detector is configured to detect, the indicator is configured to provide the indication, and the decision device is configured to provide the data, during each of plural time intervals.

3. The receiving apparatus of claim 2, further comprising a time slot identifier serving to identify the plural time intervals as plural time slots of a time-division multiple access communication system.

4. The receiving apparatus of claim 3, wherein the time slot identifier is configured to identify the plural time intervals as consecutive time slots.

5. The receiving apparatus of any one of claims 1 to 4, further comprising a sequence identifier serving to identify the plural predetermined sequences as training sequences of a time-division multiple access communication system.

6. The receiving apparatus of any one of claims 1 to 5, further comprising a channel identifier serving to identify the single physical channel as a single frequency and a single time slot of a time-division multiple access system.

7. The receiving apparatus of any one of claims 1 to 6, wherein the detector is configured to detect, the indicator is configured to provide the indication, and the decision device is configured to provide the data, when at least one of the data streams contained in the received signal comprises control channel data.

8. The receiving apparatus of any one of claims 1 to 7, wherein
 the detector comprises a correlator configured to correlate the received signal with the plural predetermined sequences to provide channel estimates, each channel estimate being provided using a respective one of the plural predetermined sequences; and
 the indicator is configured to
  measure a quality parameter of the received signal based on the channel estimates to produce a set of quality metrics, each quality metric being produced using a respective channel estimate, and provide the indication based on the quality metrics.

9. The receiving apparatus of any one of claims 1 to 7, wherein the detector comprises:

a correlator configured to correlate the received signal with the plural predetermined sequences to provide channel estimates, each channel estimate being provided using a respective one of the predetermined sequences; and an interference canceller coupled to the correlator and to the indicator and configured to perform blind interference cancellation on the received signal based on the channel estimates to produce plural interference-suppressed data, each interference-suppressed data being produced using a respective channel estimate and a respective predetermined sequence, and wherein the indicator is configured to measure a quality parameter of the interference-suppressed data to produce a set of quality metrics, each quality metric being produced using a respective predetermined sequence, and provide the indication based on the set of quality metrics.

10. A method of detecting data streams in a communication system, the method comprising:

detecting, prior to initiating a decoding process, a number of data streams contained within a signal received on a single physical channel by comparing the received signal with plural predetermined sequences and identifying one or more of the plural predetermined sequences as being likely contained within the received signal, each data stream being associated with one of the plural predetermined sequences, at least one of the predetermined sequences being based on a training sequence assigned to a mobile station during registration of the mobile station in a network;

providing an indication of the data streams likely contained in the received signal based on the identifying; and providing data defining a receiver configuration based on the indication, the receiver configuration being suitable for configuring a decoder to decode only the one or more data streams indicated as being likely contained in the received signal.

11. The method of claim 10, wherein the detecting is performed, the indication is provided, and the data is provided, during each of plural time intervals.

12. The method of claim 11, further comprising identifying the plural time intervals as plural time slots of a time-division multiple access communication system.

13. The method of claim 12, wherein the identifying the plural time intervals is performed so as to identify the plural time intervals as consecutive time slots.

14. The method of any one of claims 10 to 13, further comprising identifying the plural predetermined sequences as training sequences of a time-division multiple access communication system.

15. The method of any one of claims 10 to 14, further comprising identifying the single physical channel as a single frequency and a single time slot of a time-division multiple access system.

16. The method of any one of claims 10 to 15, wherein the detecting is performed, the indication is provided, and the data defining a receiver configuration is provided, when at least one of the data streams contained in the received signal comprises control channel data.

17. The method of any one of claims 10 to 16, further comprising:

correlating the received signal with the plural predetermined sequences to provide channel estimates, each channel estimate being provided using a respective one of the plural predetermined sequences;

measuring a quality parameter of the received signal based on the channel estimates to produce a set of quality metrics, each quality metric being produced using a respective channel estimate; and providing the indication based on the quality metrics.

18. The method of any one of claims 10 to 16, further comprising:

correlating the received signal with the plural predetermined sequences to provide channel estimates, each channel estimate being provided using a respective one of the predetermined sequences;

performing blind interference cancellation on the received signal based on the channel estimates to produce plural interference-suppressed data, each interference-suppressed data being produced using a respective channel estimate and a respective predetermined sequence;

measuring a quality parameter of the interference-suppressed data to produce a set of quality metrics, each quality metric being produced using a respective predetermined sequence and providing the indication based on the set of quality metrics.

19. A receiving apparatus for detecting data streams in a communication system, the receiving apparatus comprising:

a processor;

memory in electronic communication with the processor; and instructions stored in the memory, the instructions being executable by the processor to:

detect, prior to initiating a decoding process, a number of data streams contained within a signal received on a single physical channel by comparing the received signal with plural predetermined sequences and identifying one or more of the plural predetermined sequences as being likely contained within the received signal, each data stream being associated with one of the plural predetermined sequences, at least one of the predetermined sequences being based on a training sequence assigned to a mobile station during registration of the mobile station in a network;

provide an indication of the data streams likely contained in the received signal based on the identifying; and provide data defining a receiver configuration based on the indication, the receiver configuration being suitable for configuring a decoder to decode only the one or more data streams indicated as being likely contained in the received signal.

20. A computer program product comprising a non-transitory computer-readable media comprising code for causing a computer to:

detect, prior to initiating a decoding process, a number of data streams contained within a signal received on a single physical channel by comparing the received signal with plural predetermined sequences and identifying one or more of the plural predetermined sequences as being likely contained within the received signal, each data stream being associated with one of the plural predetermined sequences, at least one of the predetermined sequences being based on a training sequence assigned to a mobile station during registration of the mobile station in a network;

provide an indication of the data streams likely contained in the received signal based on the identifying; and provide data defining a receiver configuration based on the indication, the receiver configuration being suitable for configuring a decoder to decode only the one or more data streams indicated as being likely contained in the received signal.

21. A receiving apparatus for detecting data streams in a communication system, the receiving apparatus comprising:

means for detecting, prior to initiating a decoding process, a number of data streams contained within a signal received on a single physical channel by comparing the received signal with plural predetermined sequences and identifying one or more of the plural predetermined sequences as being likely contained within the received signal, each data stream being associated with one of the plural predetermined sequences, at least one of the predetermined sequences being based on a training sequence assigned to a mobile station during registration of the mobile station in a network;

means for providing an indication of the data streams likely contained in the received signal based on the identifying; and means for providing data defining a receiver configuration based on the indication, the receiver configuration being suitable for configuring a decoder to decode only the one or more streams indicated as being likely contained in the received signal.

22. The receiving apparatus of claim 21, wherein the means for detecting is configured to detect, the means for providing the indication is configured to provide the indication, and the means for providing the data is configured to provide the data, during each of plural time intervals.

23. The receiving apparatus of claim 22, further comprising means for identifying the plural time intervals as plural time slots of a time-division multiple access communication system.

24. The receiving apparatus of claim 23, further comprising means for identifying the plural time intervals as consecutive time slots.

25. The receiving apparatus of any one of claims 21 to 24, further comprising means for identifying the plural predetermined sequences as training sequences of a time-division multiple access communication system.

26. The receiving apparatus of any one of claims 21 to 25, further comprising means for identifying the single physical channel as a single frequency and a single time slot of a time-division multiple access system.

27. The receiving apparatus of any one of claims 21 to 26, wherein the means for detecting is configured to detect, the means for providing the indication is configured to provide the indication, and the means for providing data defining the receiver configuration is configured to provide the data defining the receiver configuration, when at least one of the data streams contained in the received signal comprises control channel data.

28. The receiving apparatus of any one of claims 21 to 27, further comprising:

means for correlating the received signal with the plural predetermined sequences to provide channel estimates, each channel estimate being provided using a respective one of the plural predetermined sequences;

means for measuring a quality parameter of the received signal based on the channel estimates to produce a set of quality metrics, each quality metric being produced using a respective channel estimate; and means for providing the indication based on the quality metrics.

29. The receiving apparatus of any one of claims 21 to 27, further comprising:

means for correlating the received signal with the plural predetermined sequences to provide channel estimates, each channel estimate being provided using a respective one of the predetermined sequences;

means for performing blind interference cancellation on the received signal based on the channel estimates to produce plural interference-suppressed data, each interference-suppressed data being produced using a respective channel estimate and a respective predetermined sequence;

means for measuring a quality parameter of the interference-suppressed data to produce a set of quality metrics, each quality metric being produced using a respective predetermined sequence; and means for providing the indication based on the set of quality metrics.

* * * * *